US010902062B1

(12) United States Patent
Guha et al.

(10) Patent No.: US 10,902,062 B1
(45) Date of Patent: Jan. 26, 2021

(54) ARTIFICIAL INTELLIGENCE SYSTEM PROVIDING DIMENSION-LEVEL ANOMALY SCORE ATTRIBUTIONS FOR STREAMING DATA

(71) Applicant: Amazon Technologies, Inc., Seattle, WA (US)

(72) Inventors: Sudipto Guha, Jersey City, NJ (US); Nina Mishra, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 826 days.

(21) Appl. No.: 15/686,086

(22) Filed: Aug. 24, 2017

(51) Int. Cl.
*G06F 16/901* (2019.01)
*G06N 7/00* (2006.01)
*H04L 12/24* (2006.01)
*H04L 29/06* (2006.01)
*H04L 12/26* (2006.01)

(52) U.S. Cl.
CPC ......... *G06F 16/9027* (2019.01); *G06N 7/005* (2013.01); *H04L 41/142* (2013.01); *H04L 43/16* (2013.01); *H04L 65/4069* (2013.01)

(58) Field of Classification Search
CPC ... G06F 16/9027; G06N 7/005; H04L 41/142; H04L 43/16; H04L 65/4069
See application file for complete search history.

(56) References Cited

U.S. PATENT DOCUMENTS

| | | | |
|---|---|---|---|
| 6,742,124 B1 | 5/2004 | Kilpatrick et al. | |
| 6,889,218 B1 | 5/2005 | Nassehi | |
| 7,050,932 B2 | 5/2006 | Selby et al. | |
| 7,124,438 B2 | 10/2006 | Judge et al. | |
| 7,296,018 B2 | 11/2007 | Abe et al. | |
| 7,739,211 B2 | 6/2010 | Coffman et al. | |
| 8,381,299 B2 | 2/2013 | Stolfo et al. | |
| 9,112,895 B1 | 8/2015 | Lin | |

(Continued)

FOREIGN PATENT DOCUMENTS

| | | |
|---|---|---|
| CN | 102360378 | 2/2012 |
| JP | 2004349846 | 12/2004 |

OTHER PUBLICATIONS

Wu, Ke, Kun Zhang, Wei Fan, Andrea Edwards, and S. Yu Philip. "Rs-forest: A rapid density estimator for streaming anomaly detection." In 2014 IEEE International Conference on Data Mining, pp. 600-609. IEEE, 2014. (Year: 2014).*

(Continued)

*Primary Examiner* — Vincent Gonzales
*Assistant Examiner* — Casey R. Garner
(74) *Attorney, Agent, or Firm* — Robert C. Kowert; Kowert, Hood, Munyon, Rankin & Goetzel, P.C.

(57) ABSTRACT

At an artificial intelligence system, a random cut tree corresponding to a sample of a multi-dimensional data set is traversed to determine a tree-specific vector indicating respective contributions of individual dimensions to an anomaly score of a particular data point. Level-specific vectors of per-dimension contributions obtained using bounding-box analyses at each level during the traversal are aggregated to obtain the tree-specific vector. An overall anomaly score contribution for at least one dimension is obtained using respective tree-specific vectors generated from one or more random cut trees, and an indication of the overall anomaly score contribution is provided.

23 Claims, 13 Drawing Sheets

(56) References Cited

U.S. PATENT DOCUMENTS

2007/0294187 A1* 12/2007 Scherrer ............. G06Q 20/401
705/75
2015/0379429 A1 12/2015 Lee et al.

OTHER PUBLICATIONS

Gama, João, Pedro Medas, and Pedro Rodrigues. "Learning decision trees from dynamic data streams." In Proceedings of the 2005 ACM symposium on Applied computing, pp. 573-577. 2005. (Year: 2005).*
Charu C. Aggarwal, et al., "Outlier Detection for High Dimensional Data", In ACM Sigmod Record, vol. 30, No. 2, 2001, pp. 37-46.
Varun Chandola, et al., "Anomaly Detection: A Survey", ACM Computing Surveys, 2009, pp. 1-72.
Xuan Hong Dang, et al., "Discriminative Features for Identifying and Interpreting Outliers", Data Engineering, 2014 IEEE 30th International Conference, 2014, pp. 88-99.
Xuan Hong Dang, et al., "Local Outliers Detection with Interpretation", Joint European Conference on Machine Learning and Knowledge Discovery in Databases, 2013, pp. 304-320.
Lei Duan, et al., "Mining outlying aspects on numeric data", Data Mining and Knowledge Discovery, 2015, pp. 1116-1151.
Amit Datta, et al., "Automated Experiments on Ad Privacy Settings: A Tale of Opacity, Choice and Discrimination", Proceedings on Privacy Enhancing Technologies 2015, pp. 92-112.
Sudipto Guha, et al., "Robust Random Cut Forest Based Anomaly Detection on Streams", Proceedings of the 33rd International Conference on Machine Learning, vol. 48, 2016, pp. 1-10.
Moritz Hardt, et al., "Train faster, generalize better: Stability of stochastic gradient descent", Retrieved from arXiv:1509.01240v2 [cs.LG], Feb. 9, 2016, pp. 1-32.
Hans-Peter Kriegel, et al, "Outlier Detection in Axis-Parallel Subspaces of High Dimensional Data", 13th Pacific-Asia Conference of Knowledge Discovery and Data Mining (PAKDD 2009), 2009, pp. 1-8.
Fei Tony Liu, et al., "Isolation-based Anomaly Detection", ACM Transactions on Knowledge Discovery from Data, vol. V, No. N, 2012, pp. 1-44.
Barbora Micenkova, et al., "Explaining outliers by subspace separability", In Data Mining, 2013 IEEE 13th International Conference, pp. 518-527.
Tomas Pevny, "Loda: Lightweight on-line detector of anomalies", Machine Learning 102, No. 2, 2016, pp. 275-304.
Petr Somol, et al., "On Stopping Rules in Dependency-Aware Feature Ranking", Iberoamerican Congress on Pattern Recognition, 2013, pp. 286-293.
Nguyen Xuan Vinh, et al., "Discovering Outlying Aspects in Large Datasets", Data Mining and Knowledge Discovery 30, No. 6, 2016, pp. 1520-1555.
Ji Zhang, et al., "HOS-Miner: A System for Detecting Outlying Subspaces of High-dimensional Data", Proceedings of the Thirtieth International Conference on Very Large Data Bases, vol. 30, VLDB Endowment, 2004, pp. 1265-1268.
U.S. Appl. No. 14/990,175, filed Jan. 7, 2016, Nina Mishra et al.
Matthias Reif, et al., "Anomaly Detection by Combining Decision Trees and Parametric Densities", 19th International Conference on Pattern Recognition, 2008: ICPR 2008; Dec. 8-11, 2008, pp. 1-4.
Sridhar Ramaswamy, et al., "Efficient Algorithms for Mining Outliers from Large Data Sets", SIGMOD Record, ACM, vol. 29, No. 2, May 16, 2000, pp. 427-438.
Victoria J. Hodge, et al., "A Survey of Outlier Detection Methodologies", Artificial Intelligence Review 22; 2004, pp. 85-126.
Leonid Kalinichenko, et al., "Methods for Anomaly Detection: a Survey", Proceedings of the 16th All-Russian Conference Digital Libraries: Advance Methods and Technologies, Digital Collections (RCDL-2014), Oct. 13-16, 2014, pp. 20-25.
Andrew Emmott, et al., "Systematic Construction of Anomaly Detection Benchmarks from Real Data", ACM Transactions on Knowledge Discovery from Data, Feb. 2015, pp. 1-27.
Pavlos S. Efraimidis, et al., "Weighted Random Sampling", Elsevier, Information Processing Letters, vol. 97, Issue 5, Mar. 16, 2006, pp. 181-185.
Frank Den Hollander, "Probability Theory: The Coupling Method", Retrieved from URL: http://websites.math.leidenuniv.nl/probability/lecturenotes/CouplingLectures.pdf, pp. 1-73.
Vladimir Vovk, et al., "Testing Exchangeability On-Line", Proceedings of the Twentieth International Conference on Machine Learning (ICML-2003), 2003, pp. 1-8.
Swee Chuan Tan, et al., "Fast Anomaly Detection for Streaming Date", IJCAI Proceedings of the Twenty-Second International Joint Conference on Artificial Intelligence, 2011, pp. 1511-1516.
Amazon Kinesis Developer Guide, Amazon Web Services, API Version, Dec. 2, 2013, pp. 1-51.
Amazon Machine Learning Developer Guide, Amazon Web Services, Version Latest Dec. 10, 2015, pp. 1-141.
Charu C. Aggarwal, "Outlier Analysis", In Data Mining, Springer International Publishing, 2015, pp. 237-263.
Jeffrey Scott Vitter, "Random Sampling with a Reservoir", ACM Transactions on Mathematical Software, vol. 11, No. 1, Mar. 1985, pp. 37-57.
U.S. Appl. No. 14/319,902, filed Jun. 30, 2014, Leo Parker Dirac, et al.
U.S. Appl. No. 14/077,173, filed Nov. 11, 2013, Marvin Michael Theimer et al.
U.S. Appl. No. 15/153,712, filed May 12, 2016, Rajeev Ramnarain Rastogi.
U.S. Appl. No. 15/719,402, filed Sep. 28, 2017, Mohammed Hidayath Ansari et al.

* cited by examiner $$AnomalyScore = \sum_{trees\ T} Pr(T) \sum_{levels\ L,\ dim\ i} \frac{1}{L} Pr(\text{point inserted at level } L \text{ in dim } i) \quad (6.1)$$

$$= \sum_{dim\ i} \sum_{trees\ T} Pr(T) \sum_{levels\ L} \frac{1}{L} Pr(\text{point inserted at level } L \text{ in dim } i) \quad (6.2)$$

By considering a sufficient number of trees, the individual contributions of different dimensions to the anomaly score can be estimated using the inner sum 610

*FIG. 6*

ARTIFICIAL INTELLIGENCE SYSTEM PROVIDING DIMENSION-LEVEL ANOMALY SCORE ATTRIBUTIONS FOR STREAMING DATA

BACKGROUND

As the costs of data storage have declined over the years, and as the ability to interconnect various elements of the computing infrastructure has improved, more and more data pertaining to a wide variety of applications can potentially be collected rapidly and analyzed. The analysis of data collected from sensors embedded at various locations within airplane engines, automobiles, health monitoring devices or complex machinery may be used for purposes such as preventive maintenance, proactive health-related alerts, improving efficiency and lowering costs. Streaming data collected from an online retailer's websites can be used to make more intelligent decisions regarding the quantities of different products which should be stored at different warehouse locations, and so on. Data collected about machine servers may also be analyzed to prevent server failures.

As the volumes at which streaming data can be produced and stored increase, the need for efficient analysis tools that work on streaming data has also increased. For example, for some security-related applications or health-related applications, the ability to identify data outliers (i.e., unusual data records or data patterns) fairly quickly may be critical. Unfortunately, many of the machine learning and statistical algorithms which have been developed over the years for such tasks were designed primarily with static data sets in mind, and may therefore be difficult to adapt and scale for fast-growing and fast-changing data.

Furthermore, even in scenarios in which anomalous data can potentially be recognized fairly quickly, explaining exactly why a particular point is designated as an anomaly or outlier may present a non-trivial technical challenge, especially when the 30 number of attributes or dimensions of the data points is large. Identifying anomalous data without accompanying explanations may result in less-than-optimal levels of satisfaction with the analytics tools or services being used, and may sometimes lead to ineffectual or misdirected responses to the occurrences of anomalies.

BRIEF DESCRIPTION OF DRAWINGS

FIG. 6 illustrates a summation reordering approach which may be used to estimate dimension-level contributions to an anomaly score of a stream data point with respect to a forest of random cut trees, according to at least some embodiments.

Figure 1:
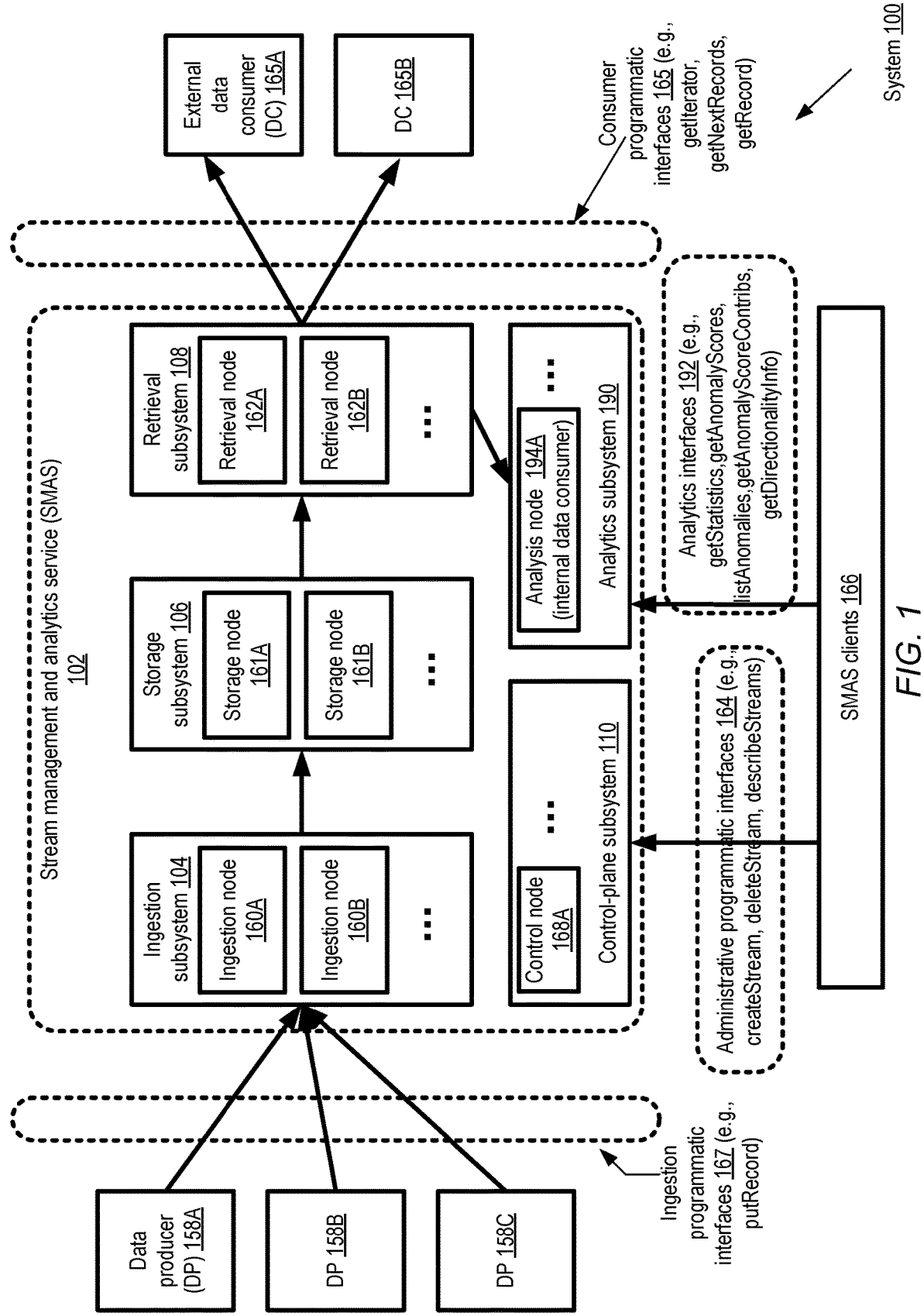
FIG. 1 illustrates an example system environment in which anomaly scores for streaming data may be generated, together with estimates of the contributions of various dimensions of the data to the anomaly scores, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for generating and providing dimension-level anomaly score attributions for at least some data points of a streaming data set are described. The terms "stream" or "streaming data set", as used herein, refer to a sequence of data points or observations that may be generated by one or more data producers and accessed by zero or more data consumers. Individual ones of the data points of the stream are assumed to be a sequence of bytes representing values of one or more dimensions or attributes. The data points of a stream may also be referred to as observation records, observations, or data records herein, and the data producers may be referred to as streaming data sources. A stream management and analytics service (SMAS) may provide programmatic interfaces (e.g., application programming interfaces (APIs), web pages or web sites, graphical user interfaces, or command-line tools) to enable the creation, configuration and deletion of streams in some embodiments. The programmatic interfaces may also enable the submission, storage, analysis, transformation and/or retrieval of stream data records in various embodiments. Dynamically provisioned sets of compute, storage and networking resources may be used to implement the service in some embodiments, based for example on various partitioning policies that allow the stream management and analysis workload to be distributed in a scalable fashion among numerous service components.

In at least some embodiments, clients of the SMAS may request the detection of unusual or anomalous data points in a specified stream, e.g., using SMAS programmatic interfaces. In other embodiments, unusual data points may be detected, and information about such points may be provided, without explicit programmatic requests as such. The terms "outlier" and "anomaly" may be used synonymously herein to refer to such points. A measure of the extent to which a given data point is unusual or anomalous relative to the stream as a whole (or relative to selected representative samples of the stream's data points) called an "anomaly score" may be computed or estimated in various embodiments using an anomaly detection algorithm. At least some level of explanation of what factors makes a data point unusual or anomalous (e.g., the estimated relative contributions of the different attributes of the data point towards its anomaly score) may also be requested or expected by a client in various embodiments. In some cases, an explicit attribution query indicating one or more targeted data points and/or dimensions for which explanations or contributions are desired may be submitted; in other cases the SMAS may simply provide dimension-level attribution information for some or all of the stream data points by default.

In some embodiments, in addition to providing information about the overall anomaly score for a data point, and/or the contributions of various dimensions to the anomaly score, an SMAS may also provide information about anomaly-causing directionality on a per-dimension basis. Conceptually, directionality information for a particular attribute or dimension d of a data point p may comprise an answer to questions similar to: "In order to decrease the anomaly score of points similar top, should the value of d in such points be increased or decreased?" (or the analogous question regarding increasing rather than decreasing the anomaly score of points like p). An algorithm that may be used for generating directionality information (e.g., in the form of vectors with elements corresponding to the "increase" direction and the "decrease" direction) in at least some embodiments is described below.

In various embodiments, one or more of at least three different kinds of anomaly-related information may be generated and provided regarding data points of a given data set: (a) the anomaly score of a data point, (b) the contributions of individual dimensions or attributes to the anomaly score and (c) directionality information associated with individual dimensions, indicating for example the direction in which the data point could change in one or more dimensions to make the data point less anomalous. The per-dimension contribution information and/or the directionality information may potentially help clients of an SMAS (or a standalone tool at which the analysis is performed) understand at least some of the reasons as to why a given data point is designated as an anomaly in various embodiments. In embodiments in which a goal of the application for which anomaly analysis is being performed is to avoid future anomalies or reduce the probability of anomalous data points, the directionality information may potentially help to identify actions which can be taken to meet such goals. In the following description, the phrase "anomaly detection" may be used broadly to refer to the analysis involved in computing anomaly scores, per-dimension contributions and/or directionality information.

In at least some embodiments, an anomaly detection algorithm which utilizes an ensemble of trees generated from samples of the streaming data set may be employed, with a given tree being constructed using a recursive sequence of randomized axis-parallel cuts with respect to a particular sample. Each axis-parallel cut may comprise splitting a set of data points into two subsets based on a selected split value of a selected dimension or attribute in such embodiments. Trees generated using such cuts or splits may be referred to as random cut trees in various embodiments, and the corresponding algorithms may be referred to as random cut forest algorithms. A number of different techniques for constructing random cut trees may be employed in different embodiments. In some embodiments, as discussed below in further detail, as a random cut tree is being constructed, the particular dimension on which the next cut or split is to be applied at a given level of the tree to a given set of data points may be selected with a probability proportional to the range of values of that dimension in that set; algorithms which use such trees may be referred to as range-biased random cut forest algorithms or robust random cut forest (RRCF) algorithms. In other embodiments, the particular dimension for the next cut may be selected at random, without taking the range of dimension values into account; such algorithms may be referred to as isolation forest (IF) algorithms.

As discussed below in further detail, a random cut forest algorithm may be able to generate an anomaly score for a given data point without modifying at least some trees of the random cut forest. For example, a probabilistic "fake" insert operation may be performed to identify a potential location within a given tree at which a node representing the given data point, and the anomaly score with respect to that tree may be determined based on various characteristics of the potential location (e.g., the depth or distance of the potential location with respect to the root node of the tree, the number of other nodes in the vicinity, and/or the distance of the potential location from other tree nodes as discussed below). In at least some embodiments, the anomaly score of a given data point with respect to a given random cut tree may be based at least in part on one or more properties or functions of a path (e.g., the length of the path) traversed from the root node of the tree to the potential insertion location of the tree. The edges of the traversed path may be selected using the values of the dimensions/attributes of the data point and the original split values and split dimensions which were selected at each level of the tree. The overall anomaly score for a given point may be obtained by aggregating the individual scores with respect to various trees of the forest in various embodiments. In some cases an anomaly score with respect to a given tree may be generated without even traversing the tree to a leaf node or determining the precise insertion location—e.g., because anomaly scores may be based at least partly on the depth at which a node is located within a tree, an anomaly score may be assigned to a given data point based on the determination that that point's insertion depth is greater than some threshold. It is noted that in the remainder of this document, the action of inserting a node representing a data point into a tree may be referred to simply as "inserting a data point" into the tree; similarly, the phrase "deleting a data point" from a tree may be used to refer to the action of deleting the node representing the data point from the tree.

Intuitively, in various embodiments, the respective relative contribution of a given dimension d to a given data point's anomaly score with respect to a tree may be based on how likely it is that that the point's d value results in the isolation or separation of the data point (as a leaf node) from the rest of the points represented in the tree. In order to estimate the respective contributions of various dimensions or attributes of the data point to its anomaly score, in some embodiments respective bounding box-based computations may be performed at each level of a random cut tree during a traversal towards a potential insertion location. A bounding box for a given node of a random cut tree generated for n-dimensional data points may represent an n-dimensional region corresponding to the ranges of dimension values of the data points represented by the descendant nodes (if any) of the node, as explained below in further detail using examples. As one descends a tree from the root node towards a leaf node, the sizes (n-dimensional volumes) of the bounding boxes grow smaller as more splits/cuts are performed; leaf nodes correspond to individual points representing minimal bounding "boxes".

At each node encountered during a traversal towards a potential insertion location for a data point p, a level-specific vector corresponding to the level or depth of the node may be generated in some embodiments based on the location of p with respect to the bounding box represented by the node. The individual elements of the level-specific vector may represent the relative contributions of different dimensions to a portion of p's anomaly score associated with the level. For example, if the data points have four dimensions and the path to a potential insertion location for point p in tree T comprises three levels of the tree, a respective vector of length four may be generated at each of the three levels (details and examples of how the vector elements may be computed in various embodiments are provided below). A tree-specific vector may be generated for each random cut tree of the forest by aggregating the level-specific vectors of that tree, e.g., by rolling-up values from lower levels of the tree as described below. Finally, the tree-specific vectors for the different trees of the random cut forest may be aggregated in various embodiments, providing an overall anomaly score contribution estimate for each of the dimensions. The overall anomaly score contribution estimate for one or more dimensions may be stored or provided in response to an anomaly score attribution query in various embodiments, thereby providing at least some level of explanation regarding the anomaly score of the data point.

It is noted that the anomaly score contribution estimates computed with respect to individual dimensions may not necessarily indicate causation. For example, consider an example scenario in which a given dimension d is identified as contributing 90% of a high anomaly score of a given data p point of a stream S. All this means is that, given the data available and analyzed with respect to S and p, and given the anomaly detection algorithm in use, 90% of the computed anomaly score is attributable to d. This does not necessarily mean that the root cause of p being anomalous can be pinpointed using the contribution estimates—for example, p may actually be anomalous at least in part because of factors that are not captured effectively in its attributes. In at least some embodiments, anomaly score contribution estimates may not necessarily be provided for data points which are not considered anomalies or outliers—e.g., for points whose anomaly scores are below a threshold.

As new data points of the stream arrive, the "average" characteristics of the stream's data may potentially change in at least some embodiments; as a result, the qualifications for a point to be designated as an anomaly may also change. Each of the trees of a random cut forest may represent a dynamically updated sample of the stream's observation records in some embodiments. A selected probabilistic stream sample update technique (e.g., a random update technique or a weighted update technique) may be used in various embodiments to decide whether a new data point should be included in the sample used for a given random cut tree. If a decision is made to update the sample used for a particular random cut tree, a node representing the new data point may be added to the tree without recreating the entire tree (e.g., by moving a sub-tree down a level, adding a new parent node for the sub-tree and a new leaf node for the added data point) in at least some embodiments. Similarly, a different node representing an eviction target data point (which is to be replaced in the sample by the node representing the new data point) may be removed from the tree without reconstructing the entire tree in such embodiments. In some embodiments, a node may be selected for deletion from a tree based at least in part on its "age"—that is, how much time has elapsed since the node was inserted in the tree, or how many data points have been added since that node was inserted into the tree.

In at least some embodiments, the algorithms used for anomaly detection and per-dimension attribution of anomaly scores may be designed to handle duplicate points. In one such embodiment, for example, a count of the number of repeat occurrences of a given data point may be maintained, e.g., associated with a leaf node representing the point in a given random cut tree. The anomaly score for such a duplicated point with respect to the tree may be based at least in part on the repeat count—e.g., a score which decreases as the repeat count increases may be generated. When computing the dimension-specific contributions to the anomaly score for a newly-arriving duplicated data point, a technique in which the contributions are estimated as though the duplicated data point had not been encountered before may be employed in at least some embodiments. For example, an anomaly score associated with a sibling node of the leaf node representing the duplicated point may be computed in such a technique, while treating the sibling node as though the node representing the duplicated data point were not present in the tree. Additional details regarding the computation of dimension-specific attributions for duplicated data points in various embodiments are provided below.

The results of the anomaly detection and dimension-specific anomaly score attribution algorithm may be indicated in any of several different formats in different embodiments. For example, in one embodiment an anomaly score and associated contributions may be generated for various data points of the stream, and the client may be provided the scores and attributions for all the data points for which such scores are computed. In other embodiments, the service may notify the client regarding data points which meet a threshold reporting criterion. For example, if anomaly scores are generated in the range 0.0 to 1.0, with 1.0 representing an extremely unusual or abnormal data point and 0.0 representing an inlier or typical data point, in one embodiment the service may only notify the client regarding data points whose anomaly score is greater than 0.7 (or some other selected threshold). The anomaly scores (and/or corresponding contribution estimates for various dimensions) generated for different data points may be stored or recorded, e.g., for later trend analysis. In another embodiment, data points may be ranked (or sorted) according to their anomaly score.

In at least one embodiment, data points of a stream, initially examined for anomalies in real time (e.g., shortly after the data points become accessible at the SMAS), may be re-examined for anomalies in batch mode later. For example, the SMAS may be implemented as a subcomponent of a more general machine learning service of a provider network, or may utilize functionality and/or resources provided by the machine learning service. Generally speaking, networks set up by an entity such as a company or a public sector organization to provide one or more services (such as various types of multi-tenant and/or single-tenant cloud-based computing or storage services) accessible via the Internet and/or other networks to a distributed set of clients may be termed provider networks in this document. A provider network may also sometimes be referred to as a "public cloud" environment. A given provider network may include numerous data centers hosting various resource pools, such as collections of physical and/or virtualized computer servers, storage devices, networking equipment and the like, needed to implement, configure and distribute the infrastructure and services offered by the provider. Within large provider networks, some data centers may be located in different cities, states or countries than others, and in some embodiments the resources allocated to a given application may be distributed among several such locations to achieve desired levels of availability, fault-resilience and performance. In some embodiments, a machine learning service of a provider network may be designed to handle both batch jobs on static collections of data, and real-time tasks on streaming data. The data points of a given stream may be stored at a repository after they are received in some embodiments. Anomaly detection may be performed in real time on the stream using random cut forest techniques of the kind outlined above, with respective anomaly scores, attributions and/or directionality information being provided to a client as soon as the scores are generated. At some later point in time, the stream may be closed, or at least a partition or logical subset of the stream may be closed, preventing additional data points from being received. The stored data points at the repository may then be re-analyzed using a batch-mode anomaly detection algorithm, and the results of the batch-mode operation may be provided to the client. In at least one embodiment, a stream may continue to receive data while batch-mode processing is performed on some subset of the stream's data which has already been collected. In some embodiments the batch-mode algorithm may also use random cut forests, and some of the same trees that were earlier used for the real-time analysis may be updated during the operations of the batch-mode algorithm. In other embodiments a different approach may be used for the batch-mode analysis than was used for the real-time analysis. In at least one embodiment, a machine learning service may support real-time analysis only with respect to streaming data, but may not support batch-mode operations on streams.

In at least some embodiments, the data set on which anomaly detection is performed may comprise batch data (e.g., a static collection of records) alone, streaming data alone, or a combination of batch and streaming data. For example, in some embodiments, an anomaly analysis feature may be incorporated within a spreadsheet or similar tool, and anomaly detection algorithms using random cut forests (including per-dimension contribution analysis and/or directionality analysis) may be executed on a specified set of static data using the spreadsheet or tool.

Respective values for a number of different parameters of an anomaly detection algorithm may have to be selected in various embodiments. Such parameters may include, for example, a size of the baseline set of data points of the stream which are to be used to generate an initial random cut forest, the number of random cut trees to be included in the forest, the sizes of the samples to be used for the individual trees, and so on. With respect to a formula or equation for anomaly score calculation, the tree depth/level parameters, distance parameters and/or sparsity parameters may have to be selected in at least some embodiments. In some embodiments, some dimensions may be assigned different weights than others, indicating for example the relative semantic importance of one dimension versus others, and such weights may be considered parameters of the algorithm. In one embodiment, a time-window or similar temporal replacement parameter may be used to update the trees. For example, with respect to replacing data points from the samples, more recently-received data points may be assigned a higher probability of being included in the samples than older data points. Other parameters of the anomaly detection algorithm may include, for example, a notification threshold to be used to determine whether a notification regarding any given anomaly score is to be provided or generated, or an anomaly designation threshold indicating the particular border score to be used for binary classification of data points as outliers or inliers.

In some embodiments, at least a portion of the anomaly detection workflow may be performed at "edge" devices of a network, or at devices whose connectivity to the Internet or to provider networks may be intermittent or limited. Such devices may not be able to rely on accessing remote computing resources for the computations associated with anomaly detection for a variety of reasons in different embodiments, such as temporary or permanent bandwidth limitations, the speed at which anomaly analysis has to be performed, and so on. For example, in an environment in which streaming data comprising state metrics collected via a large number of geographically remote/dispersed sensors has to be analyzed for anomalies quickly (e.g., in order to initiate responsive actions to unexpected or dangerous states), anomaly detection may at least temporarily be performed at one or more local devices located near the sensors, rather than using more distant computing resources of the data centers of a provider network. In some embodiments values of at least some of the parameters (such as the sample sizes, number of trees etc.) of the anomaly detection algorithms may be selected based on the resource constraints of the edge devices (e.g., relatively small amounts of memory and computation power compared to the resources available at a data center of the provider network). In various embodiments in which, under normal operating conditions, stream data collected from remote or dispersed sources is transmitted from the edge devices to computing resources at a data center for processing, under some non-typical operating conditions (e.g., during time intervals in which connectivity to the data centers is disrupted), the anomaly detection algorithms may be executed at least partially at the edge devices themselves.

In at least some embodiments, one or more of the parameter values may be selected based on entries of a knowledge base of the SMAS or a machine learning service—e.g., parameter values which have worked well in the past for similar data sets may be re-used. For example, a programmatic interface may be provided for a client to provide subjective evaluations of one or more anomaly scores, dimension-specific attributions, directionality information (e.g., how one or more dimensions of a given data point could be modified to make the point less anomalous), or other results produced by the anomaly detection algorithm on a given stream in one embodiment. The subjective evaluation information, in raw or processed form, may be stored as a knowledge base entry. Later, that knowledge base entry may be used to adjust or identify parameters to be used for outlier detection for a different stream (or even to modify parameters for newly-arriving data points of the stream for which the evaluation was provided by the client). In one embodiment, some of the parameters may be supplied by a client, e.g., via the SMAS programmatic interfaces. Although clients may not be required to be experts in statistics or machine learning, some clients may be able to provide guidance regarding one or more algorithm parameters (such as temporal replacement parameters for the samples, or weights indicating the relative importance of different attributes) based on their domain-specific expertise regarding the contents of the observation records.

Example System Environment

FIG. 1 illustrates an example system environment in which anomaly scores for streaming data may be generated, together with estimates of the contributions of various dimensions of the data to the anomaly scores, according to at least some embodiments. As shown, system 100 includes various resources of a stream management and analysis service (SMAS) 102, organized according to a scalable layered architecture with respective subsystems for receiving, storing, analyzing and providing read access to streaming data. SMAS 102 may comprise an ingestion subsystem 104, a storage subsystem 106, a retrieval subsystem 108, a control-plane subsystem 110 and an analytics subsystem 190 in the depicted embodiment. Each subsystem's resources may be scaled up or down independently of the other subsystems in the depicted embodiment—e.g., if the analytics algorithms being run require additional computational power, more servers may be added to the analytics subsystem 190 without modifying resources at other subsystems. In general, the SMAS may be used by a variety of clients for respective applications in a provider network environment, and not just for anomaly detection and anomaly score attribution. In some embodiments, the SMAS may be used to construct pipelined applications with workflows of arbitrary complexity, in which for example processing results generated from one stream may form the input data records of a second stream, the second stream may be processed to generate input data of a third and fourth stream, and so on. The contents of each such stream may be stored in a persistent fashion, e.g., by replicating raw and/or processed stream records at numerous nodes to provide desired levels of availability and data durability.

Generally speaking, each of the subsystems 104, 106, 108, 110 and 190 may include one or more nodes or components, implemented for example using respective executable threads or processes instantiated at various servers or hosts of a provider network. Nodes of the ingestion subsystem 104 may be configured (e.g., by nodes of the control subsystem 110) to obtain or receive data records of a particular data stream from data producers 158, and each ingestion node 160 may pass received data records on to corresponding nodes of the storage subsystem 106. Data producers 158, such as 158A-158C, may include a wide variety of data sources, such as an array of sensors, logs of web applications, security cameras, and the like in various embodiments. The storage subsystem nodes 161 (e.g., 161A or 161B) may save the data records on any of various types of storage devices (e.g., solid-state drives (SSDs), rotating magnetic disk-based devices, or volatile memory devices) in accordance with a persistence policy selected for the stream. Nodes 162 (e.g., 162A or 162B) of the retrieval subsystem 108 may respond to read requests from external data consumers such as 165A or 165B (which may include, for example, applications to which processed stream data is provided as input) and/or internal data consumers such as analysis node 194A of analytics subsystem 190. The analysis nodes 194 (such as 194A) may be configured to execute or implement a number of different types of statistical or machine learning algorithms in various embodiments, e.g., to provide responses to requests received from SMAS clients 166 regarding specified streams. The control subsystem 110 may include a number of control nodes 168, such as node 168A, collectively responsible for administrative operations such as creating or deleting streams, partitioning streams and the like.

A given stream may be subdivided into partitions (which may also be referred to as shards) in some embodiments. In the depicted embodiment, respective sets of one or more nodes may be designated for each partition of a stream, e.g., at least with respect to the ingestion subsystem, the storage subsystem and the retrieval subsystem. For example, ingestion node 160A may be set up for partition 0 of stream S1, ingestion node 160B may be set up for partition 1 of stream S1, and so on. Similarly, one or more storage subsystem nodes 161 may be set up for each partition, respective sets of retrieval nodes 162A may be set up for each partition as well. In some embodiments, respective subsets of the resources of the analytics subsystem 190 may also be assigned to respective stream partitions.

In the embodiment depicted in FIG. 1, SMAS clients 166 may utilize one or more sets of administrative programmatic interfaces 164 to interact with the control-plane subsystem 110. Similarly, data producers 158 may use producer programmatic interfaces 167 to submit data records, and data consumers may use consumer programmatic interfaces 165 to read the stored records. Some clients 166 may submit data analysis requests for their streams using analytics interfaces 192. A few specific examples of APIs (application programming interfaces) that may be used for submitting stream data records, retrieving stored stream data records, requesting analyses, and/or requesting administrative operations in various embodiments are also shown in FIG. 1. For example, data producers 158 may use a "putRecord" API to submit a data record into a specified stream (or a specified partition of a specified stream). In at least some embodiments, a sequencing indicator (such as a sequence number) may be associated with each data record that is stored by the SMS, and the records of a given stream may be retrievable either in sequence number order or in random order. A "getIterator" API may be used by a data consumer to indicate a starting position or starting sequence number within a stream or partition in the depicted embodiment, and a "getNextRecords" API may be used to retrieve records in sequential order from the iterator's current position. A "getRecord" API may also be supported in the depicted embodiment, e.g., for random accesses that do not require iterators to be established. Control-plane or administrative APIs may include, for example, "createStream" (to establish a new stream), "deleteStream" (to remove an existing stream), and "describeStreams" (to view properties of specified streams).

With respect to stream data analysis, a "getStatistics" API may be invoked, for example, to obtain high-level statistics regarding a specified stream, such as the number of observations or data points received, the rate of data point arrivals, the current total size of the data, the mean or variance of various numerical attributes of the data points received thus far, etc. A "getAnomalyScores" API may be invoked to obtain scores indicative of how anomalous various data points are, while a "listAnomalies" API may be used to obtain data points which have been classified as anomalies (e.g., based on a threshold anomaly score determined by the SMAS or by the client). In some embodiments, a separate "getAnomalyScoreContribs" API may be supported to request dimension-specific contributions to anomaly scores; in other embodiments, the contribution estimates for various dimensions may be provided in response to the "getAnomalyScores" and/or "listAnomalies" APIs. In at least one embodiment, directionality information of the kind mentioned above may be provided for various data points, e.g., in response to an invocation of a "getDirectionalityInfo" API or the equivalent, and/or in response to the "getAnomalyScores", "listAnomalies" or "getAnomalyScoreContribs" APIs. Other stream-oriented APIs than those shown in FIG. 1 may be employed in different embodiments. It is noted that programmatic interfaces other than APIs (e.g., web pages such as web-based consoles, graphical user interfaces and/or command-line tools) may be used in at least some embodiments.

In various embodiments, an invocation of one of the programmatic analytics interfaces 192 may signal to the SMAS that anomaly detection and/or estimation of dimension-specific contributions to anomaly scores is to be performed on a given stream whose data points are being collected (or going to be collected) from one or more data producers 158. In response, the SMAS may first collect a baseline set of data points from the specified streaming data sources in the depicted embodiment. The baseline set of data points may be used to generate an initial forest of random cut trees, with each tree corresponding to a particular sample or subset of the baseline set. The leaf nodes of the trees may correspond to respective data points, with the non-leaf nodes representing groups of data points (or "bounding boxes" of attribute values of the data points represented by the descendant nodes of the non-leaf nodes). Details and examples of how the trees may be constructed in various embodiments are provided below.

Figure 7:
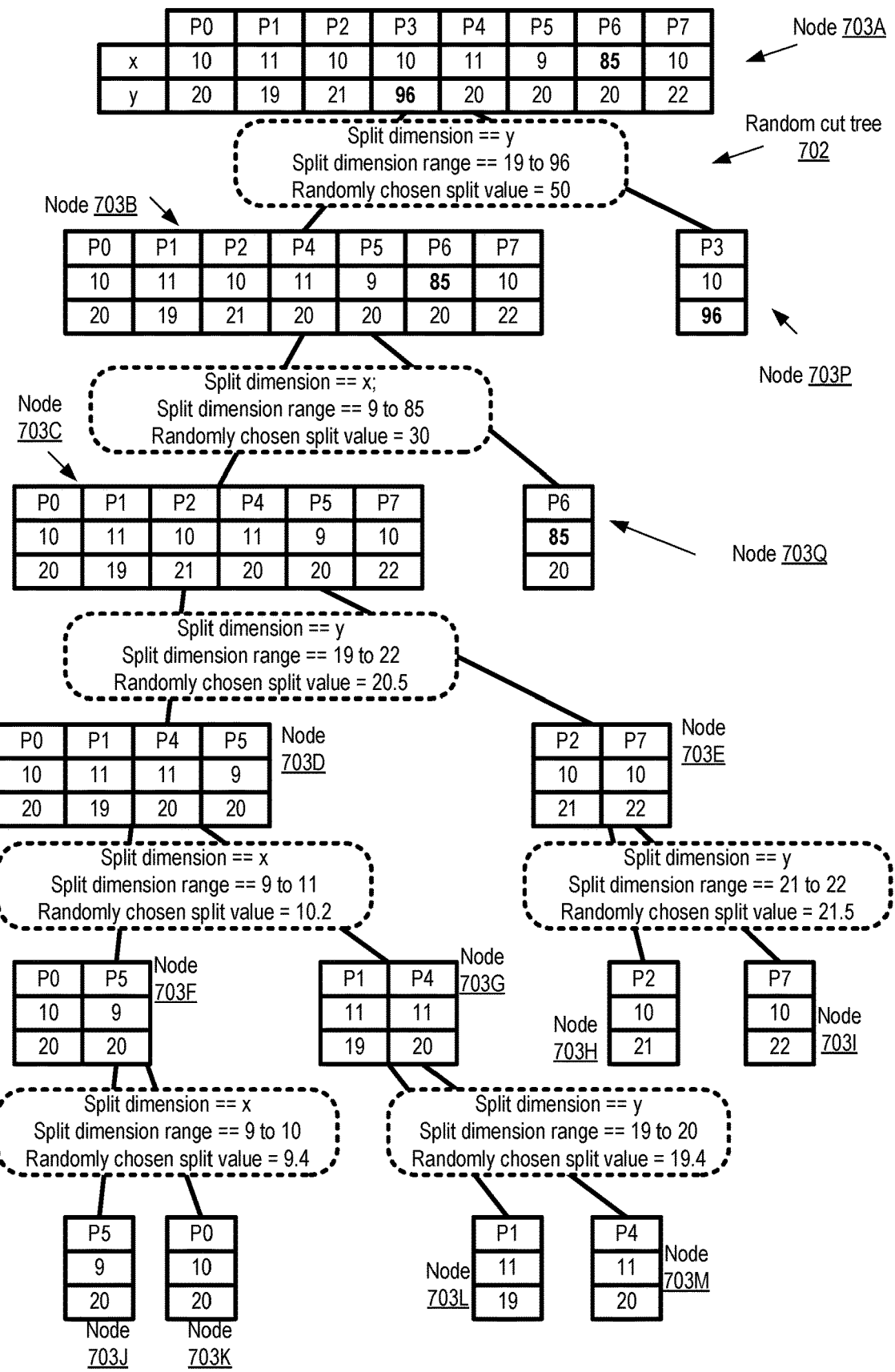
FIG. 7 illustrates an example range-biased random cut tree for two-dimensional data points, according to at least some embodiments.

In general, because of the way that the trees are constructed, for those data points represented in a tree, the location or depth of a given data point's node in a tree may be indicative of the extent to which the data point is an anomaly. As illustrated in FIG. 7 and discussed below in further detail, in at least some embodiments data points for which leaf nodes are generated at smaller depths in the tree (i.e., closer to the root of the tree) tend to be more anomalous or unusual (with respect to the population of data points represented in the tree) than data points whose leaf nodes are at greater depths. As a result, anomaly scores (e.g., real numbers in the range 0 to 1 or 0 to 100, with higher values representing more anomalous points) may be computed or assigned to data points based at least in part on the locations of the corresponding nodes in the trees (or potential locations, for those points not actually represented in the trees). For example, if ten trees are constructed for respective samples of a given baseline set of data points, and a given data point happens to be represented in three of the ten trees, then the depth for that data point across those three trees and the depth of potential insertion locations for that point across the remaining seven trees may be averaged and used as a factor to generate an anomaly score in one embodiment. In other embodiments, the sparsity of the data point's neighborhood (e.g., if the data points contain N attributes, how many other data points are near it in the N-dimensional space corresponding to the attributes) and/or the distance (e.g., the Euclidean distance) of the data points from other data points of the samples may be taken into consideration when computing an anomaly score. In some embodiments, an anomaly score for a new data point may be based at least in part on the number of points that would be displaced (e.g., moved lower) if the new point were inserted into one or more trees.

After the initial random cut forest has been constructed for a given stream using a baseline set of data points, the analytics subsystem 190 may begin analyzing new data points as they arrive. Consider an example scenario in which the forest comprises T trees. When a new data point P1 becomes accessible, in some embodiments a "fake" insert of P1 into each tree may be attempted. During the fake insert (details of which are provided below), a path to the location of the node which would have represented P1 in the tree had P1 actually been inserted may be traversed, and the fake insert locations of the nodes in the T trees may collectively be used to compute an overall anomaly score for OR1. Furthermore, in at least some embodiments, as a given tree is being traversed for a fake insertion for the new point P1, bounding-box based computations may be performed at each level to generate a level-specific vector of per-dimension contributions to the anomaly score. The level-specific vectors for a given tree may be rolled up or aggregated to generate tree-specific vectors for the dimensions, and the tree-specific vectors may be aggregated to generate overall estimates of the contributions of the different dimensions to the anomaly score in various embodiments.

In some embodiments, depending on the preferences of the client 166 on whose behalf the analysis is being performed, the anomaly score and dimension-specific contributions may be provided to the client as soon as they are computed, e.g., in real time with respect to the receiving of P1. It is noted that because the initial anomaly score and contribution estimates can only be computed based on the information available at the time that P1 is received (and cannot anticipate future data point contents), the information provided to the client in real time may represent the best available analysis only as of a given time. In some scenarios the anomaly status or score for a given data point may change if it is recomputed later, e.g., based on time-varying trends in the distribution of attribute values of the stream's data points.

In at least some embodiments, the samples used for the trees, and hence the trees themselves, may be updated probabilistically as new data points arrive. In some embodiments, a random sample update algorithm may be used, in which uniformly distributed random numbers may be used to determine whether a given new data point is to replace a previously-included data point with a given sample S. In other embodiments, a weighted random sample update algorithm may be used, in which for example more recent data points are in general more likely to be included in a sample (and hence represented in the random forest) than older data points, although the decision to include a given data point may still be made probabilistically. If a decision to insert an observation record P1 into a tree is made, a node representing P1 may be inserted at the position previously identified in the "fake" insertion operation, and a selected node may be removed to keep the sample size for the tree unchanged. In one embodiment, a time window or data point count window may be used, in which at a given time T1, only those data points received within a specified time interval (T1–delta1, T1) are analyzed to identify anomalies, or only the N most recently-received data points are analyzed to identify anomalies.

Figure 2:
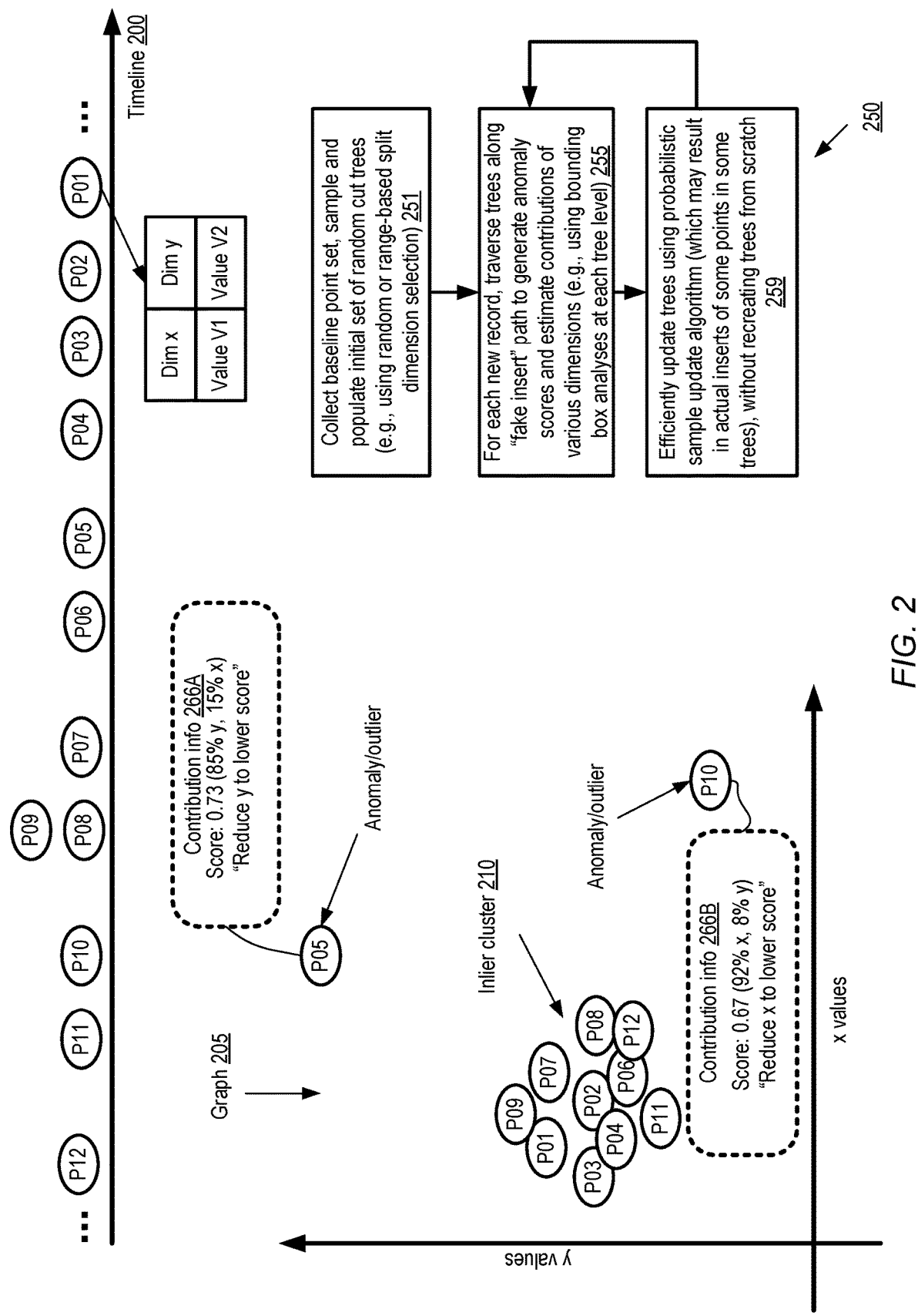
FIG. 2 provides an example of a stream of two-dimensional data points with a pair of outliers, and a high-level overview of an anomaly detection and contribution assessment algorithm, according to at least some embodiments.

FIG. 2 provides an example of a stream of two-dimensional data points with a pair of outliers, and a high-level overview of an anomaly detection and contribution assessment algorithm, according to at least some embodiments. Timeline 200 indicates the relative arrival times of 12 observation records or points P01 to P12 of the stream, each of which comprises values of two attributes or dimensions x and y. As shown, the inter-arrival times for the stream's points may vary, and some points (such as P08 and P09) arriving simultaneously or near-simultaneously. It is noted that a very small stream of records is shown in FIG. 2 to avoid clutter and to illustrate the concepts associated with anomaly detection.

Graph 205 shows a plot of the x and y values of the twelve points P01-P12. Values of x increase from left to right along the horizontal axis, and y values increase from the bottom to the top along the vertical axis. Intuitively, all the points with the exception of P05 and P10 appear to be fairly close to each other in their attribute values (and are accordingly collectively labeled inlier cluster 210), while P05 and P10 appear to be outliers or anomalies. The goals of the anomaly detection algorithm whose high-level overview is indicated in flow chart 250 are (a) to identify, as soon as possible after the arrival of a given data point such as any of P01-P12, whether that data point should be assigned an anomaly score which classifies it a member of the inlier cluster 210, or assigned an anomaly score which would indicate that it is an outlier and (b) at least for those data points identified as outliers, to provide an indication of the relative contributions of their x and y values to their anomaly scores.

As indicated in element 251, in the initial stage of the algorithm, a baseline set of data points may be collected from the stream (note that the number of points shown with respect to timeline 200 in FIG. 2 is too small to provide a useful baseline set). From that baseline set, some number of smaller samples may be selected, and respective random cut trees may be constructed for each sample, e.g., using range-biased split attribute selection or random selection of split attributes. After this initial phase is completed, in the depicted embodiment, an anomaly score (together with per-dimension contributions to the anomaly score) may be determined/estimated for each newly received data point, e.g., based on respective "fake" inserts into each of the trees (element 255). In a "fake" insert, for a given new data point the tree may be traversed starting from the root until the potential insertion location for a node representing the data point is found, without actually modifying the tree. During the traversal, at various levels of the tree, level-specific anomaly scores and per-dimension contributions to the level-specific scores may be computed, e.g., based on a comparison of the bounding boxes of the nodes encountered and the attribute values of the new data point. An anomaly score for the observation record may be determined with respect to each tree (or some selected number of trees) by rolling up the level-specific anomaly scores, and then all the scores for the different trees may be aggregated (e.g., by obtaining a mean score) to arrive at the overall or final anomaly score for the point. Similarly, the estimated contributions of each of the dimensions or attributes may be rolled up for each tree, and then the contribution estimates for all the trees may be aggregated to generate overall estimates for each of the dimensions.

The final scores and/or the contribution estimates for various dimensions for some or all points may optionally be reported to one or more destinations and/or stored in persistent storage, depending on the reporting and/or score persistence preferences of the client on whose behalf the stream is being analyzed. In the illustrated scenario, overall anomaly scores and contribution estimates for those scores are shown only for the outliers P05 (contribution information 266A) and P10 (contribution information 266B). As suggested by the locations of P05 and P10 relative to the inlier cluster 210 in the x-y plane, P05's anomaly score (0.73, assumed to be on a scale of 0-1) may be attributed largely (85%) to itsy value, while P10's anomaly score (0.67) may be attributed largely (92%) to its x value in the depicted example. (Note that the numerical quantities shown in FIG. 2 are arbitrarily selected to illustrate the concepts involved, and are not intended to represent any specific calculations.) In addition the anomaly scores and per-dimension contributions, in the depicted embodiment, directionality information regarding at least one dimension (e.g., the dimension whose contribution towards the anomaly score is highest) may also be provided. For example, in contribution information 266A, the message "Reduce y to lower score" indicates that the y value should be lowered to lower the anomaly score most effectively. Similarly, with respect to P10, contribution information 266B indicates that reducing the x value would be a good approach towards lowering the anomaly score. In some embodiments, natural language messages such as those shown in FIG. 2 or graphical symbols such as "up" or "down" arrows may be used to provide directionality information; in other embodiments, numeric values such as the elements of directionality vectors discussed below may be provided instead or in addition to natural language messages and/or symbols.

As shown in element 259, zero or more of the trees may be probabilistically updated by actually inserting a node representing a given data point (and deleting a node to keep the sample size unchanged) in the depicted embodiment. These types of insertions, called "true" insertions herein, may typically be performed less frequently than the "fake" insertions used for anomaly score calculations in at least some embodiments. The insertion of a new node into a given tree may involve rearranging subsets of the tree's nodes without recreating the tree from scratch, and may therefore be more efficient than if each insertion required reconstructing the entire tree. Operations corresponding to elements 255 and 259 may be repeated for new data points, e.g., until the stream is terminated in the depicted embodiment. Over time, the trees would change as more nodes are replaced, and the contents of the trees (and hence the anomaly scores derived from the trees) would tend to represent the more recent data points more closely than the data points which arrived in the more distant past.

Presentation of Anomaly Score Contribution Estimates

Figure 3:
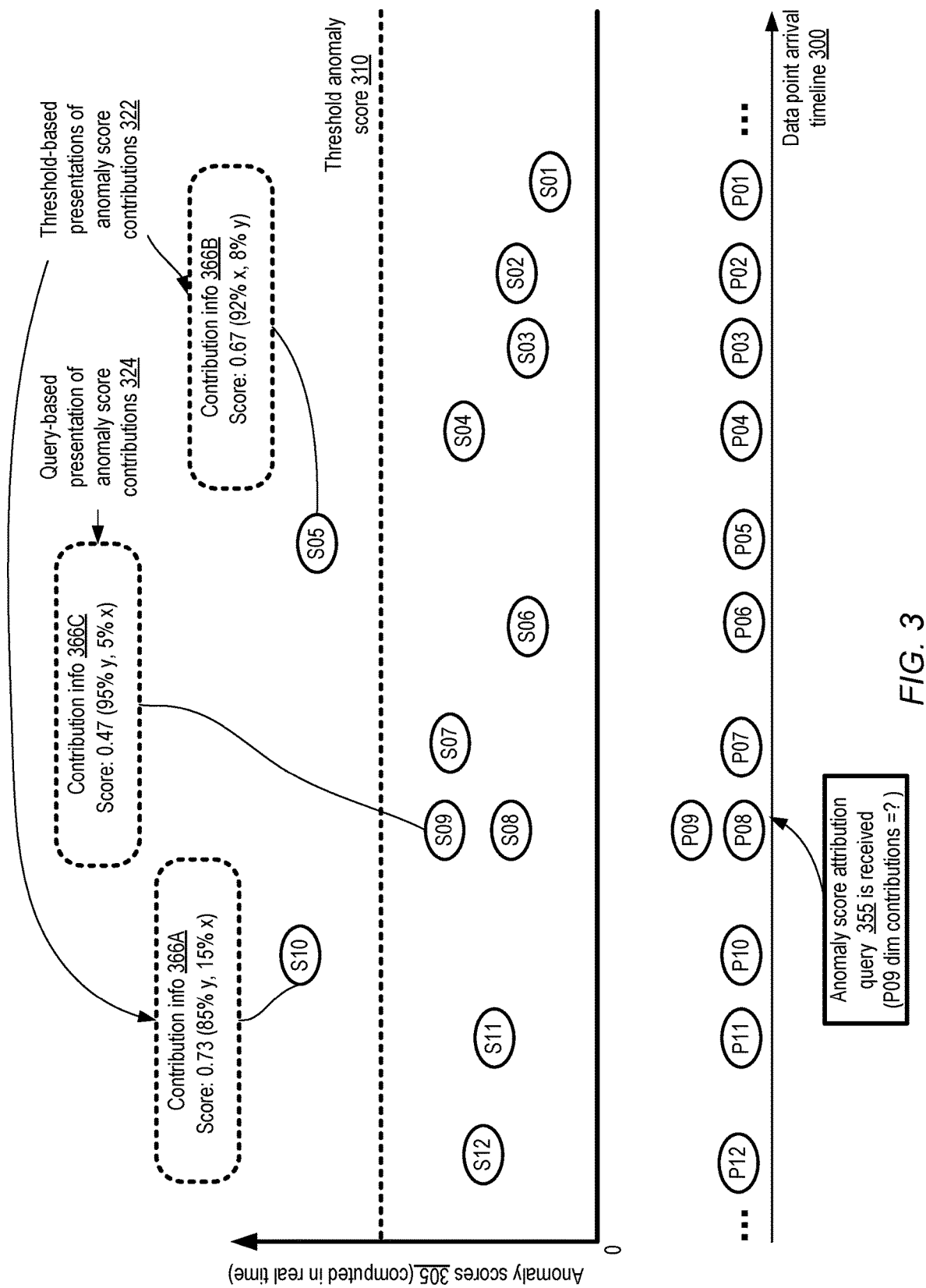
FIG. 3 illustrates examples of threshold-based and query-based presentation of anomaly scores and contributions, according to at least some embodiments.

FIG. 3 illustrates examples of threshold-based and query-based presentation of anomaly scores and contributions, according to at least some embodiments. Data point arrival timeline 300 shows an arrival sequence of two-dimensional data points P01-P12. Using the random cut forest based techniques discussed above, respective anomaly scores 305 for the data points (scores S01-S12 respectively for the points P01-P12) may be computed in real time or near-real time in the depicted embodiment. Those data points whose anomaly scores lie below a threshold 310 (which may be selected by the service at which the analysis is done and/or by the client on whose behalf the analysis is being done) may be regarded as normal or inlier points, while those data points such as P05 and P10 whose anomaly scores exceed threshold 310 may be regarded as outliers or anomalies.

In the depicted embodiment, anomaly scores and per-dimension contributions to such scores may be presented to clients, e.g., via web-based consoles, graphical user interfaces, notification tools and the like, in at least two types of circumstances. If the anomaly score for a data point exceeds the threshold 310 (as in the cases of P05 and P10), the scores and per-dimension contributions 366A and 366C may be provided to clients as soon as (or very shortly after) they are computed, without waiting for requests from clients for such data. These types of presentations may be referred to as threshold-based presentations 322.

In addition, clients may submit queries regarding anomaly scores and/or dimension-specific contributions at various times after the corresponding data points are encountered in the depicted embodiment, regardless of whether the scores of the data points exceed the threshold 310 or not. For example, an anomaly score attribution query 355 pertaining to P09 is received shortly after P09 (whose score does not exceed the threshold 310) arrives, and the corresponding information 366B may be presented to the client as soon as it is computed. This latter type of presentation may be referred to as a query-based presentation 324. Other combinations of presentation modes may be supported in different embodiments—e.g., in some embodiments, only query-based presentations may be supported. Parameters such as reporting thresholds, formats, and/or notification mechanisms may be selectable by clients in various embodiments. Arbitrary queries regarding per-dimension anomaly-related information (such as the equivalent of a query similar to "During the last two days, how many anomalous data points have been encountered for which the x value's contribution was more than 60%?") may be processed at the analytics system performing anomaly detection in some embodiments. It is noted that directionality information (not shown in FIG. 3), may also be provided in some embodiments for some or all data points, e.g., based on thresholds or in response to queries.

Range-Biased Tree Construction Example

Figure 4:
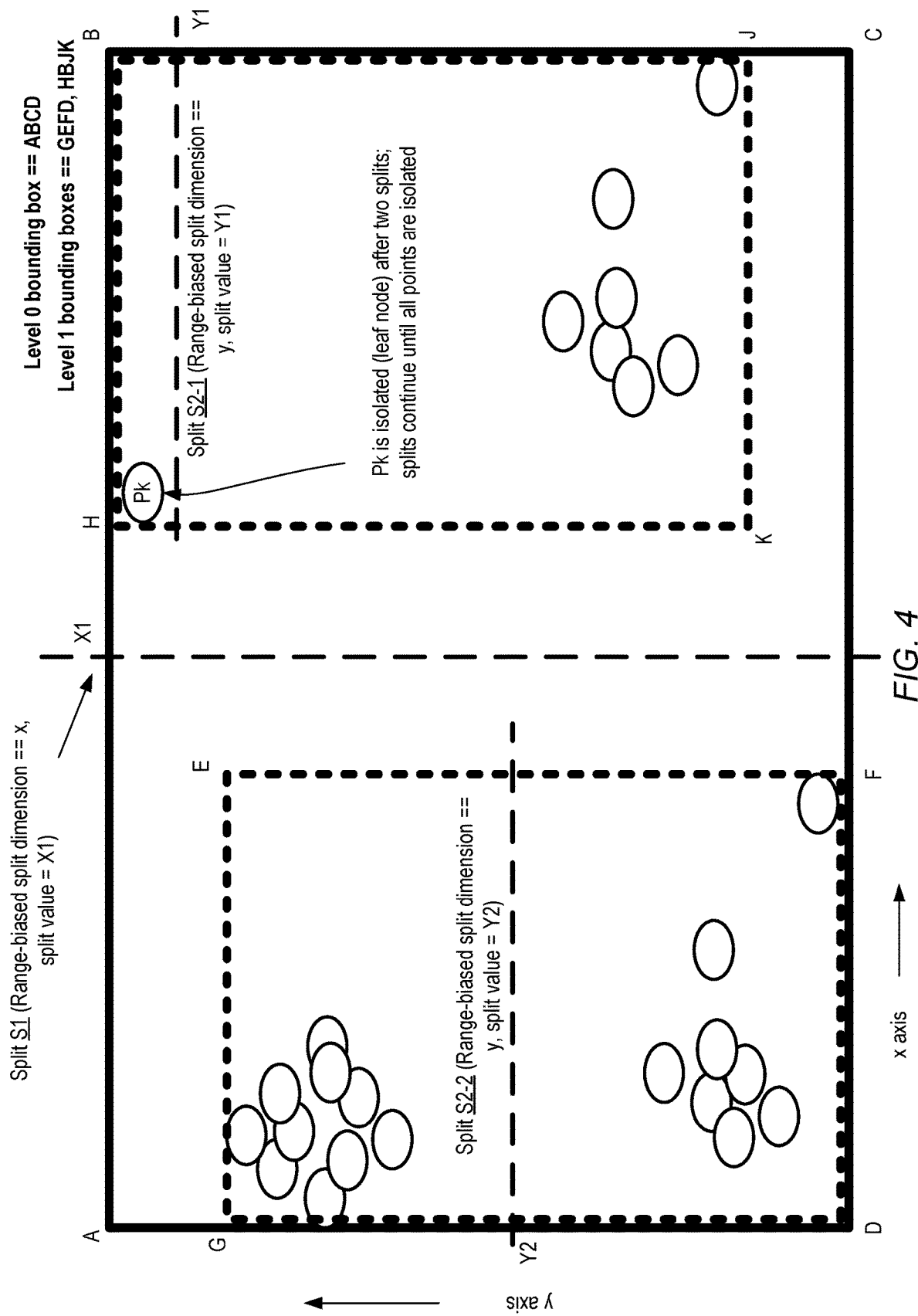
FIG. 4 illustrates a few example splits of a stream data sample which may be performed to generate a range-biased random cut tree, according to at least some embodiments.

As mentioned earlier, any of a number of techniques may be used to generate random cut trees used for anomaly detection in different embodiments, with different criteria being used for cutting or splitting the data point samples. FIG. 4 illustrates a few example splits of a stream data sample which may be performed to generate a range-biased random cut tree, according to at least some embodiments. A two-dimensional data set is used in the example scenario illustrated, and the data set is assumed to remain unchanged during the time period corresponding to the initial splits or cuts. Each data point contains values for two numeric attributes or dimensions x and y. A "bounding box" ABCD in the two-dimensional x-y space contains all the points being considered. For a given set of two-dimensional data points such as those shown in FIG. 4, the bounding box corresponds to the area formed by multiplying (x-max-x-min) by (y-max-y-min), where x-max is the largest value of x among the records, x-min is the smallest value of x among the records, y-max is the largest value of y among the records, and y-min is the smallest value of y among the records. (x-max-x-min) may be referred to as the "range" or "span" of x, and (y-max-y-min) may be referred to as the "range" or "span" of y. The concept of bounding boxes (which may be extended to any desired number of dimensions) may be used extensively herein when discussing operations associated with random cut trees.

In the embodiment depicted in FIG. 4, in the first step of constructing a random cut tree for the data points, a particular dimension may be selected (e.g., with a probability based on the dimension's value range) as the dimension on which the sample of data points is to be split. In FIG. 4's split S, attribute x is selected as the first range-biased split attribute, and a value of X1 for x (chosen, for example, at random within the range of x) is used to subdivide the data points into two smaller subsets. The first subset corresponds to bounding box GEFD, and the second subset corresponds to bounding box HBJK. The bounding box ABCD containing all the data points being analyzed may be referred to as a "Level 0" bounding box, and may be represented by a root node in a corresponding random cut tree. The child bounding boxes GEFD and HBJK may be referred to as "Level 1" bounding boxes and may each be represented by a respective child node of the root of the random cut tree.

After the Level 1 bounding boxes have been identified, the process of random splitting may be recursively applied to the Level 1 bounding boxes to produce Level 2 bounding boxes, e.g., using splits S2-1 and S2-2 as shown. In both splits S2-1 and S2-2, they dimension has been chosen as the split dimension; y split values Y1 and Y2 have been selected for the two splits respectively. As a result of split S2-1, point Pk has been isolated (it is the only point in one of the split results) in the depicted embodiment. In at least some embodiments, recursive range-biased splits may be performed until all the data points have been isolated from one another. In at least some embodiments, the fewer the number of splits that occur before a given data point is isolated, the more anomalous that point may be considered relative to the other data points of the sample—thus, in the example shown, Pk is one of the more anomalous data points of the depicted sample as it becomes isolated after just two splits. Of course, the selection of the split dimensions and the split values may be at least partially randomized in various embodiments, so the number of splits before a given point is isolated (and hence its anomaly score) may not be deterministic in general.

In various embodiments, the function used to select the split dimension for the splits being performed during the construction of a random cut tree may be referred to as the dimension-selection function, and the function used to select a split value for a given dimension may be referred to as the value-selection function. It is noted that the per-dimension contribution estimation techniques described herein are applicable to a variety of random cut forest algorithms, and are not limited to algorithms in which any particular combination of dimension-selection function and value-selection function is used. Thus, a range-based split dimension-selection function is not a requirement for the use of the described techniques.

Bounding Box Operations Example for New Data Points

Figure 5:
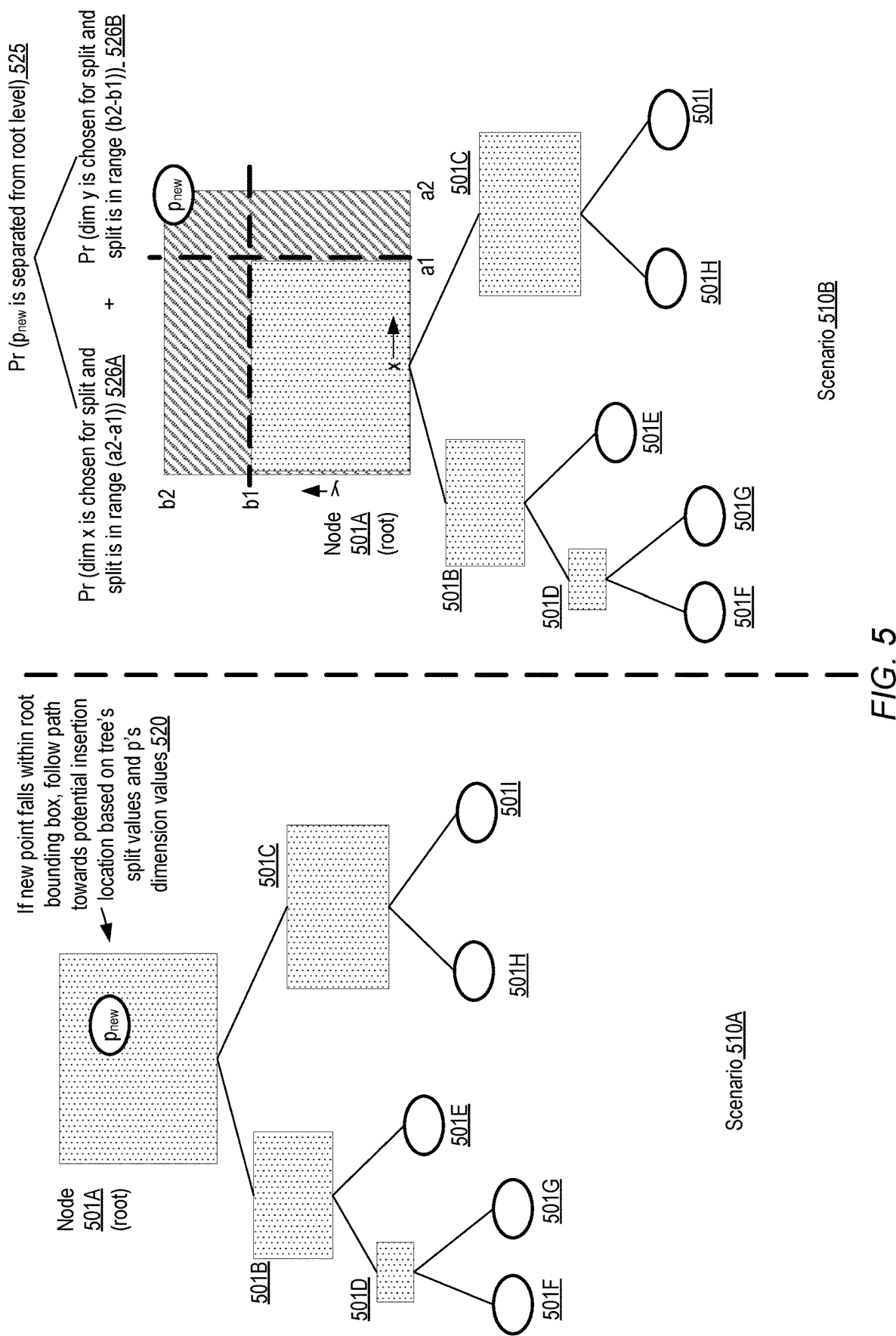
FIG. 5 illustrates aspects of bounding box based operations which may be performed to estimate dimension-level contributions to an anomaly score of a stream data point with respect to a particular random cut tree, according to at least some embodiments.

FIG. 5 illustrates aspects of bounding box based operations which may be performed to estimate dimension-level contributions to an anomaly score of a stream data point with respect to a particular random cut tree, according to at least some embodiments. A random cut tree with nodes 501A-501I has been constructed using a sample of data points of a stream in the depicted embodiment, e.g., using a range-biased dimension-selection function or a random dimension-selection function. Bounding boxes for the different levels of the tree (with points rather than boxes for the leaf nodes) are depicted as rectangles in FIG. 5. The anomaly score of a new point $p_{new}$ with respect to the depicted tree is to be determined, along with the contributions of the different dimensions to the score.

Bounding box based operations may be performed at each level of the tree along a path to the potential insertion location for $p_{new}$ in the depicted embodiment to estimate the anomaly score and dimension-specific contributions. At the root level, for example, two alternative scenarios 510A and 510B are depicted in FIG. 5. Either, as in scenario 510A, the values of the dimensions of the new point are such that it falls within the root 501A's bounding box, or (as in scenario 510B), the new point may lie outside the bounding box of root node 501A.

In the first alternative scenario 510A, because $p_{new}$ lies within the bounding box of node 501A, it would not be possible to isolate or separate $p_{new}$ from the tree at the root node level. As a result, the value used to split the sample at the root level along the dimension selected when constructing the tree may be compared to the corresponding value of $p_{new}$, and one of the child nodes of node 501A (either 501B or 501C) may be selected as the next node to traverse. At the selected child node, the same kind of bounding box-based analysis may be performed.

In the second alternative scenario 510B, the values of $p_{new}$ attributes may lie outside node 501A's bounding box. As a result, there may be a non-zero probability that if $p_{new}$ were to be inserted into the tree, it may be isolated or separated at the root level itself. Assume that the non-negative integer (x,y) lengths for node 501's bounding box are (a1, b1), and that $p_{new}$'s (x,y) values are (a2, b2). Then, in the depicted embodiment, the probability 525 that $p_{new}$ is separated as a leaf node from the root level may be computed as the sum of the values 526A and 526B, where 526A represents the probability that dimension x is chosen as the split dimension at the root level and the split value-selection function selects a value between a2 and a1, and 526B represents the probability that dimension y is chosen as the split dimension at the root level and the split value-selection function selects a value between b2 and b1. The ratio of these two quantities 526A and 526B may represent the respective estimated relative contributions of the dimensions x and y to the anomaly score for $p_{new}$. if $p_{new}$ were isolated as a child node from the root node, and the corresponding conditional portion of the anomaly score itself (conditioned on the separation of the new point from the root) may be calculated as a function of the length (one in this case) of the path between the root node and the potential insertion location of the new leaf node for $p_{new}$.

Of course, because random numbers are used to determine split values in the depicted embodiment, there is a non-zero probability that despite the fact that $p_{new}$ lies outside the bounding box for root node 501A, it would not be separated from the root node. Therefore, a path based on the actual split value used when constructing the tree may be traversed for $p_{new}$, with similar bounding-box based calculations performed to obtain the contributions to the anomaly score at each level. The estimated level-specific contributions for each dimension may be rolled up for the tree as a whole (e.g., using respective weights at each level which correspond to the probability of traversing down to the next level). After tree-specific estimates have been obtained, the contributions for different trees of the forest may be combined in various embodiments to arrive at the overall or final contribution estimates for each dimension, and to arrive at the overall anomaly score. In at least some embodiments as discussed below in the context of FIG. 8-FIG. 10, the level-specific contributions may be estimated at the leaf level first, and rolled up or combined in a reverse traversal order to the root node—e.g., first the path to a potential insertion (leaf-level) node may be identified, then calculations may be performed at the leaf level, the estimates rolled up at the next-to-leaf-level, and so on all the way back to the root level. A formal version of an algorithm which may be used to estimate contributions for the anomaly score is provided below, together with a toy example showing specific calculations for one version of the algorithm.

FIG. 6 illustrates a summation reordering approach which may be used to estimate dimension-level contributions to an anomaly score of a stream data point with respect to a forest of random cut trees, according to at least some embodiments. In the depicted embodiment, Pr(T) corresponds to the probability of observing the exact same sequence of events (the traversal) as evaluating the new point in the context of tree T (in terms of splits of the point set corresponding to a node, the root to leaf path followed by the point in the specific tree T, and the chosen split dimensions along that path but not the specific split values of the chosen dimensions). The summation over T stands for a shorthand of summation over different traversals as the observed tree T varies. The overall anomaly score of a new data point may be estimated by performing three levels of summations. In the formulation shown in 6.1, the anomaly score with respect to a given traversal of the tree T is assumed to be inversely proportional to the level L at which the new point would be inserted into the tree. The innermost summation in formulation 6.1 is with respect to dimensions i: the level-specific anomaly score at a given level L of the tree consists of the sum of the probabilities, over each dimension, of the insertion of the new point based on the particular dimension being selected as the final or separating dimension at that level. The second summation (over levels L) of formulation 6.1 combines the level-specific anomaly scores for a given traversal of T. The outermost summation combines the anomaly scores for the different (traversal of) trees of the forest, with the probability of each traversal being selected (Pr(T)) being taken into consideration.

The summations shown in formulation 6.1 may conceptually be re-ordered as shown in formulation 6.2 to separate the contributions of the different dimensions in the depicted embodiment. The underlying assumption is that if the summation over the dimensions is moved to the outermost position, and a sufficient number of trees are included in the forest, the individual contributions of the dimensions may be estimated using the inner sum (the remaining two summations).

Formal Algorithms for Tree Construction and Per-Dimension Contribution Estimation In various embodiments, implementations of one or more versions of the following algorithms may be used to generate random cut forests for streaming data sets, and to compute estimates of anomaly scores and dimension-specific contributions to the anomaly scores. It is noted that the tree creation algorithm (Generalized-TC) and the attribution algorithm (Generalized-Attribution) discussed below may be used in a variety of scenarios, including scenarios in which Robust Random Cut Forests (RRCF) or Isolation Forests (IF) are used. It is also noted that the Generalized-Attribution algorithm, as presented initially below, assumes that the data stream does not comprise duplicate data points; extensions of the algorithm to handle duplicate data are provided later.

Generalized-TC (Tree Construction) Algorithm

1. Given a collection of points at level L of a tree, assume the points define a d-dimensional bounding box $B_L$ with edge lengths $l_1, \ldots, l_d$.

2. Assume that a function $F(j, B_L)$ selects dimension j given $B_L$. For example, in the case of weighted RRCFs, $F(j, B_L) = w_j l_j / \Sigma_i w_i l_i$, and in the case of weighted $L_p$-trees $F(j, B_L) = w_j l_j^p / \Sigma_i w_i l_i^p$ with $p \geq 0$. Different classes of trees would be constructed as the dimension-selection function F( ) is varied.

3. Choose a random split value in the range of the $j^{th}$ dimension of the box $B_L$, split (i.e., partition) the data based on that split value, and recurse on both sides.

Generalized Attribution Algorithm

Assumption A1: We have a random cut tree T_ of d-dimensional points with respect to which the anomaly score of a new data point q is to be estimated, and the attribution contributions of the d dimensions are to be determined.

Assumption A2: The anomaly score for q is inversely proportional to the depth at which q would be inserted, were it to be inserted into T_.

1. Given a d-dimensional bounding box $B_L$ at level L of T_ with edge lengths $l_1, \ldots, l_d$. If we are not at a leaf node of T_, suppose the cut or split is C along split dimension s.
2. Given the point q, let the side lengths of a new bounding box $B'_L = B_L \cup \{q\}$ be $l'_1, \ldots, l'_d$. Note that $\forall j, l_j <= l'_j$.
3. At a leaf node (assuming no duplicates) return the vector a(.,L) of length d, where $$a(j,L)=F(j,B'_L)/(L+1) \quad \text{Equation (1)}$$

and where F is the dimension selection function introduced in the Generalized Tree Construction algorithm above. Note that the split at the leaf node would make the depth of the new leaf node L+1.

4. Otherwise (if we are not at a leaf node of T_) the dimension s corresponding to the cut C at level L of T_ exists; this implies that $l's>=ls>0$. Define:

$$z_s=(l_s F(s,B'_L))/(l'_s F(s,B_L))$$

(As discussed below, for (weighted) RRCFs, note that $z_s = \Sigma_i w_i l_i / \Sigma_i w_i l'_i$; =z, independent of the dimensions)

5. Compute the vector a(.,L+1) recursively by following the cut C in dimension s.
6. Return the vector $$a(j,L)=(1/(L+1))((l'_j-l_j)/l_j))F(j,B'_L)+z_s a(j,L+1) \quad \text{Equation (2)}$$

As indicated above in step 3 of the Generalized Attribution algorithm, in at least some embodiments, the a(j, L) vector computed at a leaf node at level L of the tree would comprise respective elements representing the contributions to the anomaly score value components for the new data point q (with respect to that level) of various dimensions. The value of a given element of the vector corresponding to a particular dimension j would be based on the value of the dimension-selection function F( ) associated with a potential insertion of the new data point as a child of the leaf node with j as the separating dimension, and each of the values would also depend on the depth of the leaf node L in the tree.

Similarly, at a non-leaf node, as indicated in steps 4-6, an a vector with per-dimension contribution elements would be computed in at least some embodiments, with a slightly more complex set of calculations than for leaf nodes. For the non-leaf node, the vector elements would be based on (a) the value of the dimension-selection function F( ) associated with the insertion of the new data point q as a child of the non-leaf node, (b) the depth L of the non-leaf node and (c) a weighted value for the a vector of the level (L+1), where the weight ($z_s$) is indicative of the probability that in a potential insertion of q into T_, q would not have been inserted as a child of the non-leaf node. In various embodiments, the weighted values of the contribution estimates may thus be rolled up or combined staring from the leaf level of the random cut tree and proceeding to the root level to obtain the overall contribution estimates, as illustrated in the toy example discussed below in the context of FIG. 8-FIG. 10.

In some embodiments, implementations of each of the algorithms described herein for tree generation and per-dimension contribution estimation for anomaly scores may, for example, include memory for storing input values and parameters and computer-executable instructions for a set of computations on the input values. Any of a number of types of data structures may be used for storing data and/or implementing the algorithm logic, e.g., including various tree-based structures as well as data structures optimized for storing matrices, vectors, arrays, hash tables and the like.

Example Random Cut Tree

FIG. 7 illustrates an example random cut tree for two-dimensional data points, according to at least some embodiments. In the depicted example, a range-biased dimension selection function is used to perform the cuts or splits at leach level of a tree constructed for a set of eight data points P0-P7. Each observation contains respective values for two numeric attributes x and y. With the small number of records included in the example, it is relatively easy to determine (even without constructing the tree) that with respect to dimension x, most points cluster in the value range 9-11, with P6 being an outlier with an x value of 85, and that with respect to y, most points cluster in the value range 19-22, with P3 being an outlier with a y value of 96.

The root node of random cut tree 702 corresponds to the bounding box representing all 8 records. y is chosen as the first split dimension with probability proportional to its range (96–19)/((96–19)+(85–9)). y's range in the root's bounding box is 19 to 96, and a split value of 50 is chosen (e.g., using a random value-selection function) from within that range. As a result, at tree depth 1, two nodes are created: node 703B with 7 observations whose y values are less than 50, and node 703P with one observation (P3). The process of splitting the non-leaf nodes (i.e., nodes which represent more than one data point) is continued with respect to node 703B and its child nodes. x happens to be the attribute selected for the second split, and the split value 30 is chosen for the second split, resulting in the creation of non-leaf node 703C and leaf node 703Q (representing P6). At level 3, y is chosen again as the split dimension, and the split value of 20.5 is selected from the y range 19 to 22, resulting in non-leaf nodes 703D and 703E. Eventually, a leaf node is created for each data point. The depths (number of hops required to reach the leaf node from the root) of the leaf nodes corresponding to the observation records is as follows: P0, P1, P4 and P5 are each located at depth 5, P2 and P7 are at depth 4, P6 is at depth 2 and P3 is at depth 1.

Thus, tree 702 provides one example where the nodes corresponding to outliers (P3 and P6) end up at smaller depths (closer to the root) than the nodes representing observations which are inliers. Of course, if the split dimensions are chosen using some level of randomization (even if the ranges of the values of the dimensions are used to bias the probabilities), and the split values are also chosen at random, it may sometimes be the case that some outliers happen to be placed at greater depths than some inliers. However, if a sufficiently large number of random cut trees is constructed, in general the average tree depth of a node (with respect to all the trees in which it is represented) may tend to be negatively correlated with the outlier status of the corresponding data point—that is, the smaller the average depth, the more likely it may be that the data point is an anomaly. This logic may be used to determine anomaly scores for new data points in various embodiments, as illustrated below using the example steps shown in FIG. 8-FIG. 10. That is, the probability distributions of inserting the new point as a leaf node (separating the new point from the rest of the points) at various levels of the tree may be determined, and anomaly score contributions corresponding to each of the possible insertion locations may be determined for each of the dimensions and summed up. In different embodiments, the absolute values of the anomaly scores for new data points (and per-dimension contributions) may be determined using a number of additional terms (e.g., normalization factors) in addition to the depths of the potential insertion points and the probabilities associated with the separations.

Calculations for Toy Per-Dimension Attribution Example

Figure 8:
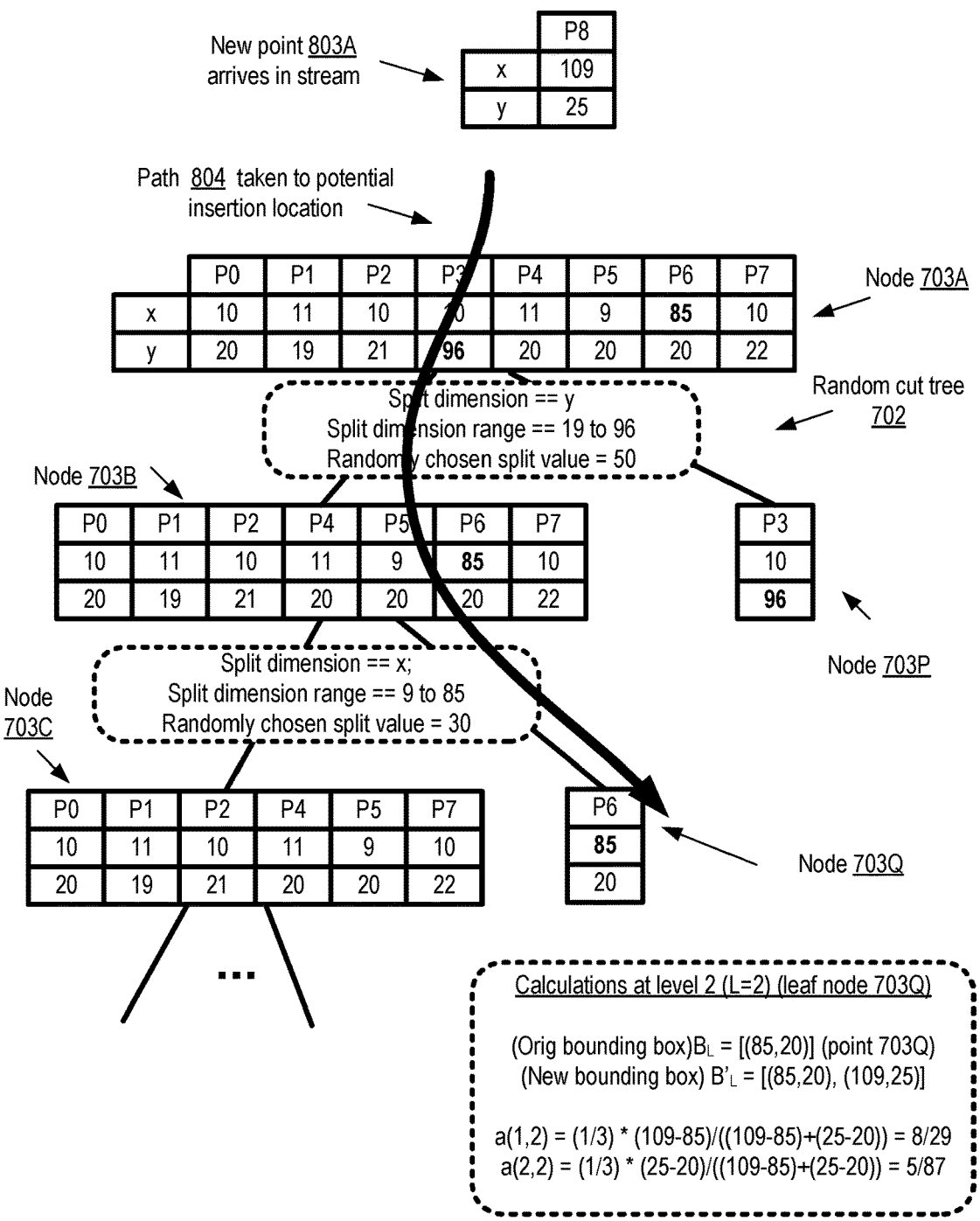
FIG. 8, FIG. 9 and FIG. 10 collectively illustrate a trivial set of example 30 computations which may be performed to estimate tree-level anomaly score contributions for a new point of a data stream for which the random cut tree shown in FIG. 7 was generated, according to at least some embodiments.
Figure 9:
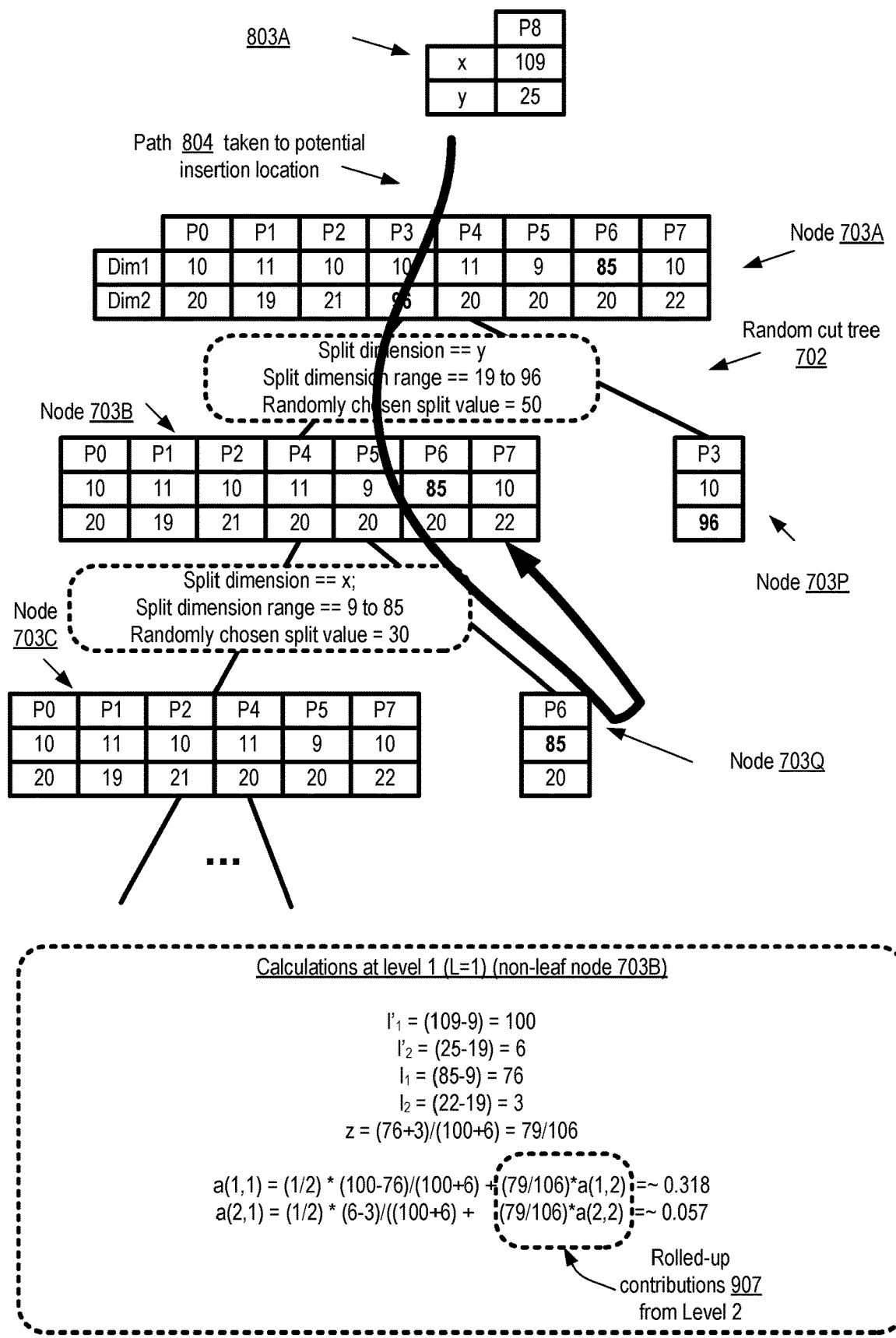
Figure 10:
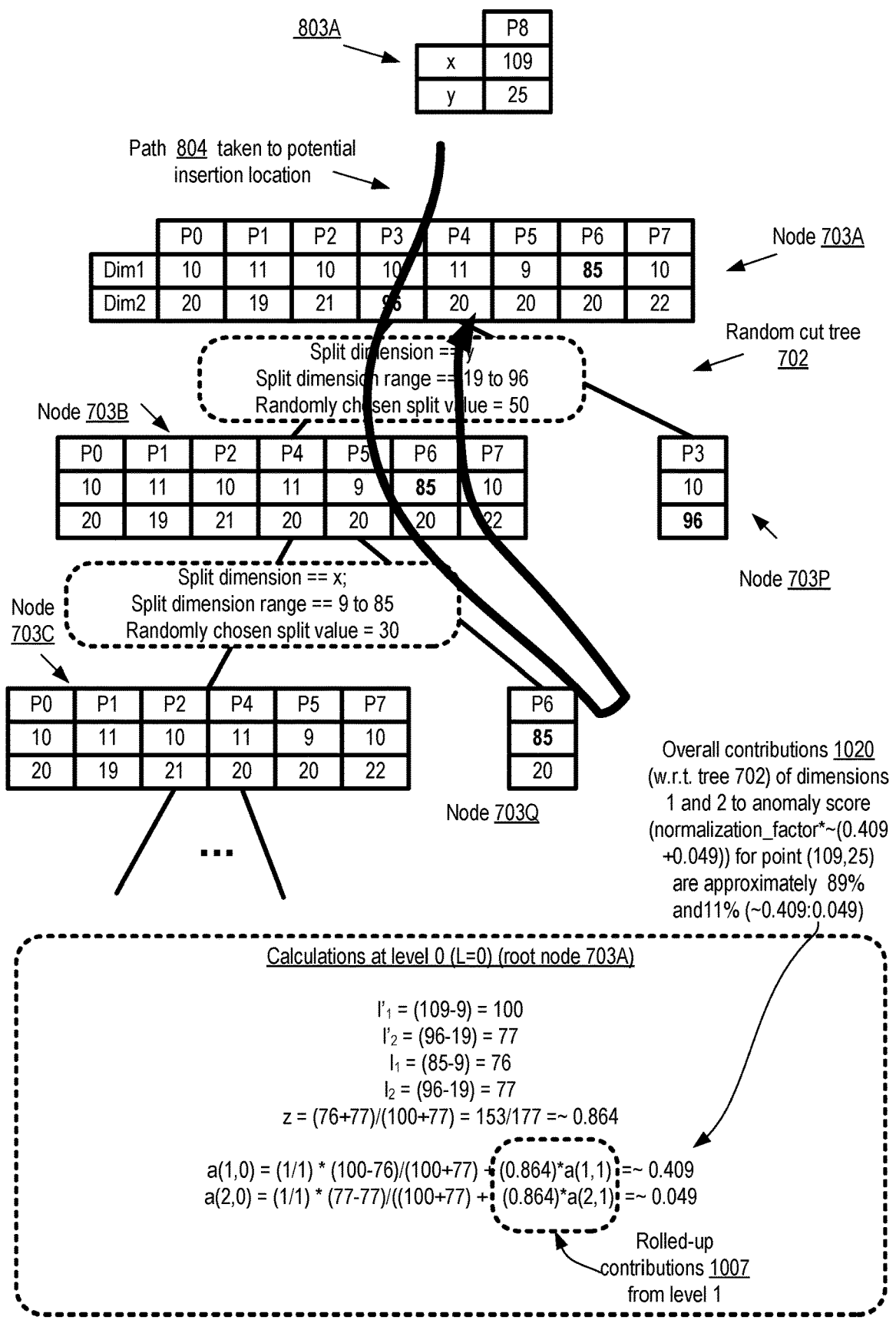

FIG. 8, FIG. 9 and FIG. 10 collectively illustrate a trivial set of example computations which may be performed to estimate tree-level anomaly score contributions for a new point of a data stream for which the random cut tree shown in FIG. 7 was generated, according to at least some embodiments. As tree 702 is an example of an RRCF tree, the generalized attribution algorithm discussed above is re-formulated in an RRCF-specific manner as follows for use in this example.

Weighted-RRCF-Specific Attribution Algorithm

Assumption A1.1: We have an RRCF tree $T\_$ of d-dimensional points with respect to which the anomaly score of a new data point q is to be estimated, and the attribution contributions of the d dimensions are to be determined.

Assumption A2.1: The anomaly score for q is inversely proportional to the depth at which q would be inserted, were it to be inserted into $T\_$.

1. Given a d-dimensional bounding box $B_L$ at level L of $T\_$ with edge lengths $l_1, \ldots, l_d$. If we are not at a leaf node of $T\_$, suppose the cut or split is C along split dimension s.

2. Suppose the dimension j of the box $B_L$ is defined by the interval $[b^-_j, b^+_j]$; therefore, $l_j = b^+_j - b^-_j$ 3. Given the point $q = (q_1, q_2, \ldots, q_d)$, let the side lengths of a new bounding box (which contains q) $B'_L = B_L \cup \{q\}$ be $l'_1, \ldots, l'_d$. Note that the interval corresponding to the $j^{th}$ dimension is now $$[\min\{q_j, b^-_j\}, \max\{q_j, b^+_j\}]$$

Note also that $l'_j = \max\{q_j, b^+_j\} - \min\{q, b^-_j\}$, and that $\forall j$, $l_j <= l'_j$.

4. At a leaf node (assuming no duplicates) return the vector $a(.,L)$ of length d, where $$a(j,L) = (1/(L+1))w_j l'_j / \Sigma_i w_i l'_i \quad \text{Equation (3)}$$

Note that the split at the leaf node would make the depth of the new leaf node L+1, and that Equation (3) is an RRCF-specific version of Equation (1) of the Generalized Attribution algorithm provided above.

5. Otherwise (if we are not at a leaf node of $T\_$) the dimension s corresponding to the cut C at level L of $T\_$ exists; this implies that $l's >= ls > 0$. Define:

$$z = \Sigma_i w_i l_i / \Sigma_i w_i l'_i;$$

6. Compute the vector $a(.,L+1)$ recursively by following the cut C in dimension s.

7. Return the vector $$a(j,L) = (1/(L+1))w_j(l'_j - l_j)/\Sigma_i w_i l'_i + za(j,L+1) \quad \text{Equation (4)}$$

Note that Equation (4) is a simplification of Equation (2) shown in the context of the Generalized Attribution algorithm above.

As shown in FIG. 8, a new point P8, with (x,y) values of (109, 25) may be received, and anomaly score calculations for P8 may be performed in accordance with the RRCF-specific attribution algorithm indicated above. Based on the (x,y) values of P8 and the original splitting decisions made for tree 702, the path 804 from the root node may be taken towards a potential insertion location as a child of leaf node 703Q in the depicted embodiment. Note that in the attribution algorithm used in the depicted embodiment, evaluation first follows the splits/cuts down the tree and then rolls up; the fact that a point is outside the bounding box of one of the nodes encountered on the way down may be taken care of in the roll up phase. If the choice of the range biased cut was not outside the parameters of the original bounding box in such an embodiment, then without loss of probability or generality, the same set of cuts that were used earlier may be re-used as shown (and therefore the same path may be followed from the root node down the tree). As 703Q is a leaf node, calculations according to Equation (3) may be performed to obtain the two-dimensional vector (a(.,2)). The relative contribution of dimension x at level 2, a(1,2), is estimated as 8/29 using the bounding box-based calculations of equation (3). The relative contribution of dimension y at level 2, a(2,2) is estimated as 5/87. Intuitively, given the dimension values 109 and 25 for P8 and the ranges of the original points used for the tree 702, the fact that the x dimension has a greater contribution than they dimension should not be unexpected.

In FIG. 9 and FIG. 10, the path taken to leaf node 703Q is traversed backwards towards the root, and respective contribution estimation calculations are performed at each level. As shown in FIG. 9, the values of the elements of vector a(.,2) may be weighted (using the z weighting factor) and summed when estimating the anomaly score contributions at the non-leaf node 703B of level 1, in accordance with Equation (4). In the depicted embodiment, the weighting factor z may represent the probability that the new node q would not be inserted as a child of the node 703B, but would instead be inserted as a child of node 703Q. At level 1, the a(.,1) vector (~0.318, ~0.057)(approximate values to three decimal places are shown) may represent the rolled-up contributions 907 from level 2 and the contributions at level 1 itself.

Finally, in FIG. 10, the contributions from the non-root nodes are combined with the contributions at the root node (as indicated by the rolled-up contributions term 1007), resulting in the vector (~0.409, ~0.049) for the final vector a(.,0) of contributions of dimensions (x,y) in accordance with Equation (4). In the depicted embodiment, a normalization factor may be applied to the sum of the two elements of a(.,0) to obtain the overall anomaly score. The overall contributions of the two dimensions would be approximately 89% for dimension x and approximately 11% for dimension y in the depicted toy example (in the approximate ratio (0.409/0.049)).

Provider Network Environment

Figure 11:
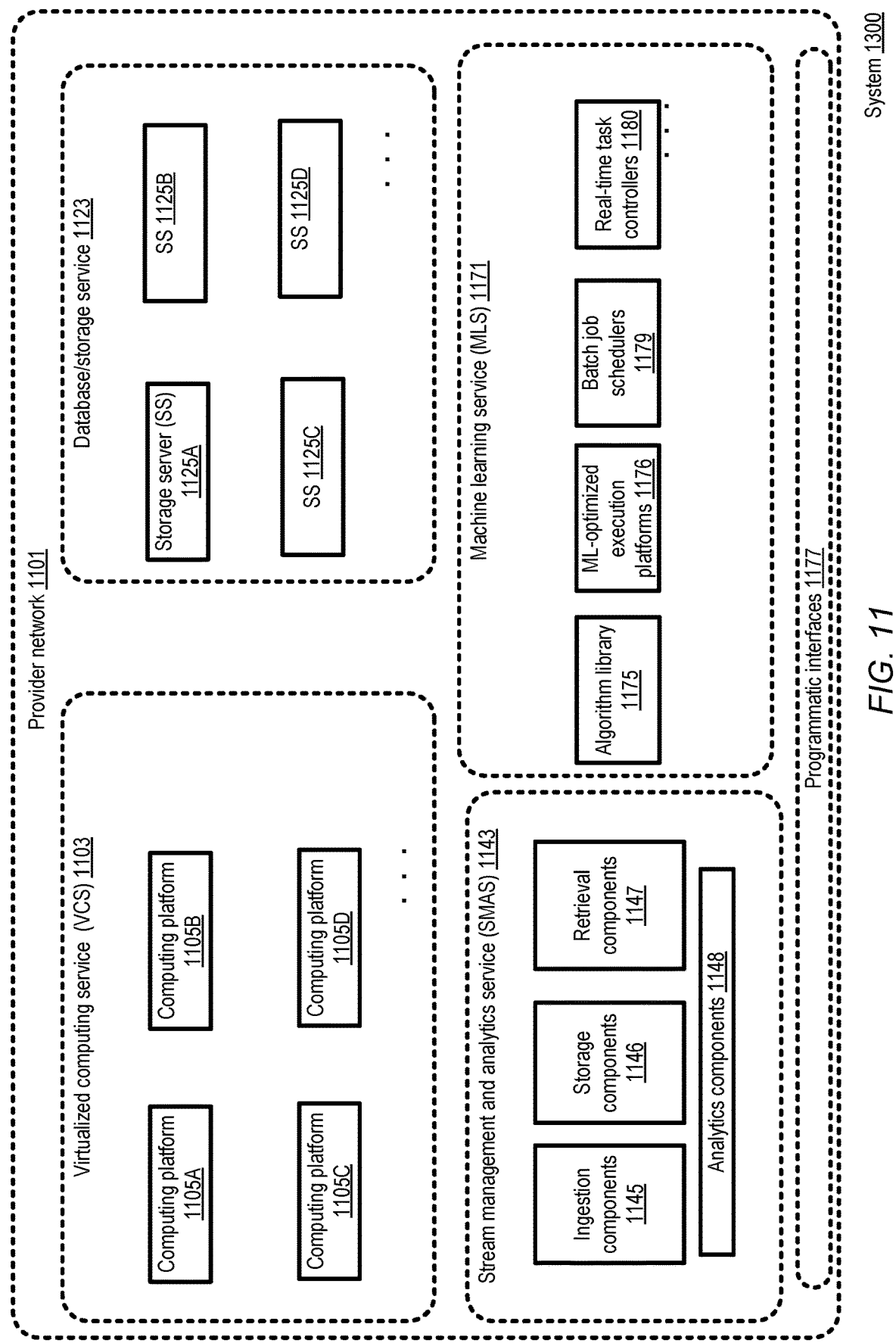
FIG. 11 illustrates a provider network environment at which a stream management and analytics service may be implemented, according to at least some embodiments.

In at least some embodiments, anomaly analysis of streaming data may be performed at a provider network, e.g., potentially utilizing resources of a variety of services. FIG. 11 illustrates a provider network environment at which a stream management and analytics service may be implemented, according to at least some embodiments. As mentioned earlier, networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments.

In the depicted embodiment, provider network 1101 may comprise resources used to implement a plurality of services, including for example a virtual computing service 1103, a database or storage service 1123, a machine learning service 1171, and a stream management and analytics service 1143. The machine learning service 1171 may comprise an algorithm library 1175, a set of execution platforms 1176 optimized for machine learning, a set of batch job schedulers 1179 and a set of real-time task controllers 1180. The stream management and analytics service 1143 may comprise a set of ingestion components 1145, storage components 1146, retrieval components 1147, and analytics components 1148 in the depicted embodiment. Components of a given service may utilize components of other services in the depicted embodiment—e.g., for some machine learning tasks, a component of the machine learning service 1171 may utilize virtual machines implemented at computing platforms such as 1105A-1105D of the virtualized computing service. Input data, intermediate results, final results and/or other artifacts of various machine learning algorithms or models, as well as stream data and analysis results, may be stored at storage servers 1125 (e.g., 1125A-1125D) of the database or storage service 1123 in some embodiments. Individual ones of the services shown in FIG. 11 may implement a respective set of programmatic interfaces 1177 which can be used by external and/or internal clients (where the internal clients may comprise components of other services) in the depicted embodiment.

In at least one embodiment, the random cut forest based algorithms discussed above may be implemented at least in part using resources of the MLS 1171, the VCS 1103 and/or database/storage service 1123. For example, execution platforms 1176 that are optimized for machine learning tasks (e.g., platforms that have customized hardware such as GPU arrays and/or customized software stacks) may be used to rapidly generate anomaly scores (and per-dimension contributions) for arriving data points of various streams. In some embodiments, sets of one or more random cut trees may be generated in parallel at respective execution platforms of the MLS 1171 and/or the VCS 1103. Similarly, in at least one embodiment, per-tree anomaly scores (and per-dimension attributions of those scores) may be computed in parallel using respective execution platforms. Virtual machines of computing platforms 1105 may be used for some anomaly detection and presentation tasks in some embodiments. In at least some embodiments, the kinds of anomaly detection and attribution algorithms described above may be performed on batch data (e.g., stream data accumulated over some time period). In such scenarios, batch job schedulers 1179 may be used to coordinate the analysis of various sets of collected streaming data, to re-run anomaly detection algorithms with different samples of stream data, and so on. In some embodiments, a network-accessible service of a provider network may not necessarily be used to implement anomaly detection. Instead, for example, a standalone tool implemented at one or more computing devices which are not part of a network-accessible service may be used in such embodiments.

Methods for Dimension-Specific Attributions of Anomaly Scores

Figure 12:
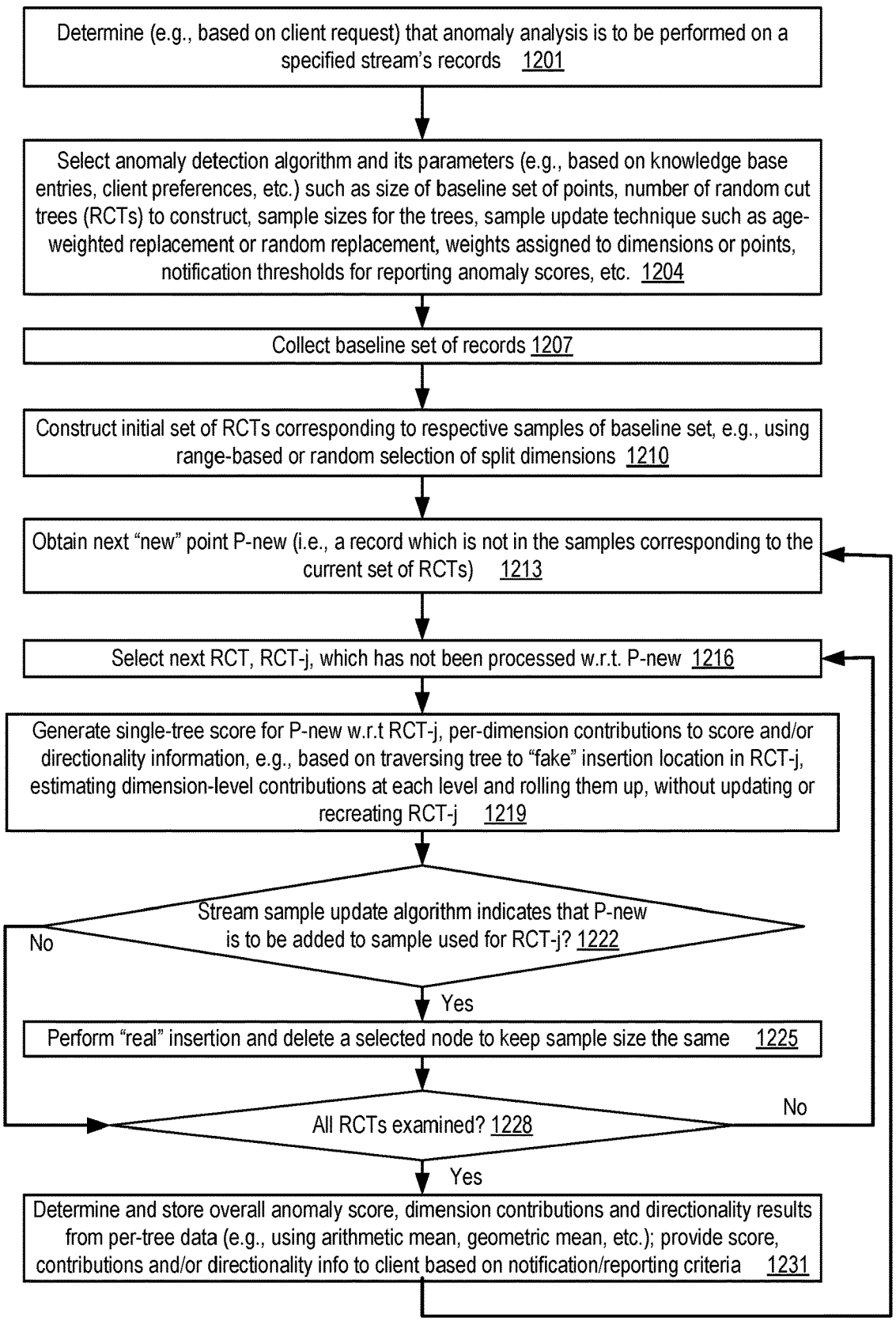
FIG. 12 is a flow diagram illustrating aspects of operations that may be performed to identify anomalous data points of a stream and estimate dimension-level contributions to the anomaly scores of the points, according to at least some embodiments.

FIG. 12 is a flow diagram illustrating aspects of operations that may be performed to identify anomalous data points of a stream and estimate dimension-level contributions to the anomaly scores of the points, according to at least some embodiments. As shown in element 1201, a determination that anomaly detection and anomaly score attribution is to be performed on the data points or records of a specified stream may be made, e.g., based on a request received from a client, or simply as part of the default statistical analysis on streaming data provided by an analytics service. A particular anomaly detection algorithm such as RRCF or Isolation Forest may be selected, and values of a number of parameters of an the selected algorithm may be identified (element 1204), e.g., based on preferences indicated by the client, knowledge base entries of the analytics service or machine learning service at which the stream is to be analyzed, or using default settings. The parameters may include, for example, the size of the baseline set of records to be collected to construct the initial set of random cut trees, the number of trees to be constructed, the sample sizes to be used for the trees, parameters of the anomaly score generation function, sample update algorithm parameters (e.g., whether sample members are to be replaced using unweighted random selection, or whether some points are to be weighted more than others when deciding which points should be included in a sample), weights assigned to individual dimensions, notification thresholds for reporting anomaly scores/status, etc.

A baseline set of data points of the stream may be collected (element 1207), and an initial set of range-based random cut trees (RCTs) may be generated from respective samples of the baseline set (element 1210). A probabilistic iterative splitting strategy may be used to construct the trees, in which the bounding boxes of the tree nodes may be split at various stages along a selected dimension or attribute. The particular dimension or attribute along which a split is to be performed at a given stage may be selected, e.g., either completely at random or based at least partly on the range of the dimension's values among the data points which are to be split at that stage. For example, if a choice between two dimensions dim1 and dim2 is to be made when splitting a collection of stream points, and dim1 values vary between 100 and 200 in the collection while dim2 values vary between and 20, the probability of choosing dim1 as the split attribute may be set to (200−100)/((200−100)+(20−10)) or 100/110 in an embodiment in which value ranges are used to select split dimensions. In some embodiments, other functions of dimension ranges may be used to select split dimensions—e.g., the probability of selecting a given dimension may be proportional to the logarithm of its range. In some embodiments, respective anomaly scores may be assigned to the nodes of the initial set of trees—e.g., based on the depths of the nodes in the trees, the relative isolation of the nodes, and so on.

After the initial set of trees is constructed, they may be used to perform anomaly detection with respect to new, previously unseen data points of the stream. When the next point of the stream P-new which is not represented in the current set of trees is received (element 1213), at least two types of operations may be performed: (a) anomaly score and per-dimension anomaly score attribution calculations (which may involve "fake" inserts into some or all trees) (b) sample updates, which may involve actual node inserts and deletions into some or all trees. The order in which these two types of operations are performed may vary in different embodiments, or the two kinds of operations may be performed in parallel. In the embodiment depicted in FIG. 12, each tree may be considered one at a time, a local anomaly score for P-new may be calculated along with its per-dimension attributions with respect to a given tree, a decision as to whether a sample update is to be performed for that tree may be made, and then the tree may be updated if the decision to insert a new node representing P-new is made. In other embodiments, the decision as to whether to update the tree may be made before the local anomaly score is calculated, so "fake" inserts may only be required if a real or true insert is not to be performed.

After the next tree RCT-j, which has not been processed with respect to P-new is selected (element 1216), the local or single-tree anomaly score for P-new may be calculated for RCT-j based on the potential location of the node representing P-new in RCT-j (element 1219) as determined in a "fake" insert. In at least some embodiments, the per-dimension anomaly score contributions and/or directionality information may be computed at each level of the path to a potential insertion location of the new point in RCT-j. Bounding-box based calculations as described earlier in the context of the Generalized-Attribution or Weighted-RRCF-Specific-Attribution algorithms (and/or as described below in the discussion regarding a directionality analysis algorithm) may be used in some embodiments. Next, the per-dimension scores, per-dimension attributions and/or directionality information may be rolled up or summed to determine the overall anomaly-related measures for RCT-j. A "fake" insert involved in the calculation of the attributions and the anomaly score with respect to RCT-j may differ from a true insert in that the changes resulting from a "fake" insert may not be saved or made permanent in the depicted embodiment. The anomaly score with respect to RCT-j may be based on a combination of one or more characteristics of the potential insertion location in some embodiments—e.g., the depth of the corresponding node within the tree, the sparsity of neighbor nodes (e.g., nodes with a common parent or ancestor with respect to the potentially inserted node), and/or the minimum distance of other nodes from the potentially inserted node. In at least one embodiment, a local or tree-level anomaly score may be generated for P-new without necessarily traversing the tree all the way to a leaf node, or without determining the precise location of the potentially inserted node. For example, a score may be assigned based simply on determining (during a fake insert) that the node representing P-new would be inserted at a depth greater than a threshold. In one implementation, for example, a threshold of depth 10 may be used, and a data point for which a leaf node has not been inserted even though 10 levels of the tree have been traversed may simply be assigned a low anomaly score.

A probabilistic stream sample update algorithm may be invoked to determine whether an actual insertion into RCT-j is to be performed with respect to P-new (element 1222), i.e., whether the sample corresponding to RCT-j is to include P-new or not. In some embodiments the probability of inclusion of a given point such as P-new in a sample may be independent of the point's arrival time or arrival sequence, while in other embodiments newer data points may be assigned a higher probability of inclusion in a sample than older data points. If a decision to include P-new is made, a victim node representing a data point which is to be deleted may be identified, and a true insert (which may result in the insertion of a node at the previously-identified potential insertion location) may be performed (element 1225) together with a corresponding delete to keep the sample size unchanged. The order in which the insert is performed relative to the delete may vary in different implementations. If the probabilistic sample update algorithm indicates that RCT-j is not to be updated (as also detected in operations corresponding to element 1222), and additional trees remain to be examined (as detected in element 1228) the operations corresponding to elements 1216-1228 may be repeated for the next tree. After all the trees have been examined with respect to P-new, an overall anomaly score, overall per-dimension contributions to the score (and overall directionality vectors or components of the attributions as described below) may be determined from the corresponding per-tree measures (element 1231). For example, the arithmetic mean of the per-tree scores and/or attributions, or the geometric mean, or the median, may be used to generate the overall anomaly score and/or attributions in some implementations. The score may be stored in a persistent repository and/or provided to the client on whose behalf the anomaly detection is being performed based on the client's reporting or notification criteria. In some embodiments, feedback may be obtained from clients regarding the anomaly scores that were generated. For example, if a client disagrees, based on their expertise in the domain for which streaming data is being collected, with a high anomaly score assigned to a given data point, the client may indicate their disagreement (and perhaps provide an explanation). Such feedback or evaluation of the quality of the analysis may be stored in a knowledge base and/or used to modify parameters of the anomaly detection algorithm in some embodiments. In at least one embodiment, a client may not necessarily want anomaly scores to be generated for all data records—instead, a client may ask that anomaly results be provided only for specified observations. In one such scenario, the analytics service responsible for anomaly detection may still construct and update random cut trees as discussed above, but may assign scores only to data points for which specific requests have been received. Similarly, in some embodiments, per-dimension attributions may not be performed for at least some data records of a stream—e.g., attribution estimates may be obtained only for a subset of data points identified using some criteria.

It is noted that in various embodiments, some of the operations shown in FIG. 12 may be implemented in a different order than that shown in the figure, or may be performed in parallel rather than sequentially. For example, the computations associated with a given tree may be performed in parallel with the computations associated with a different tree in some embodiments, assuming that a sufficient set of execution platforms (such as machine learning servers) is available. Additionally, some of the operations shown in FIG. 12 may not be required in one or more implementations.

Duplicate Handling

As mentioned earlier, the attribution algorithms described above (the Generalized-Attribution algorithm as well as the Weighted-RRCF-Specific Attribution algorithm) assume that the streaming data being analyzed does not include duplicate data points. In at least some embodiments, the algorithms may be extended to allow multiple data points with identical values for their dimensions to be handled in a duplicate-agnostic manner. An attribution algorithm may be said to be duplicate agnostic in various embodiments if the attribution of the anomaly score to the different dimensions for the second occurrence (or occurrences after the second occurrence) are in proportion to the attributions to the different dimensions for the first occurrence. As more duplicate data points with identical values arrive in the stream, the anomaly score for the point should decrease, and a point which was initially designated as an outlier should eventually no longer be designated as an outlier. In at least some embodiments, an anomaly score which decreases with (a) the length of the path to the insertion location of the data point and (b) the duplication count of the data point may be computed, as indicated in the following duplicate-resilient RRCF attribution algorithm. As indicated in steps 4 onwards of the algorithm, the anomaly score contribution estimate of a duplicated data point represented by a leaf node of a tree may be based at least in part on a bounding box of a sibling node (SN) of the leaf node. (Note that while all the weights w of the dimensions are assumed to be 1 in the algorithm as presented, the extension to other values for the weights is straightforward)

Duplicate-Resilient RRCF Attribution Algorithm

1. If the Weighted-RRCF-specific attribution algorithm described above is executed, a leaf node corresponding to the point q would be reached at a level L in a particular tree. Let the multiplicity or duplication count of q be C(q)−1.

2. We set the anomaly score Score(q) to be returned as $1/(L+\log_2 C(q))$. We compute a vector of pseudo-scores which divides Score(q) among the dimensions of q.

3. We check if the leaf node corresponding to q has a sibling. If no sibling is present, the entire tree correspond to a multi-sample of q (which may occur in a dynamic scenario in some embodiments if the stream reaches a constant input stage). In this case, assuming d dimensions, the contribution of each of the dimensions may be set to (1/d)(Score(q)).

4. Otherwise, a sibling node SN is present, and we compute a(j, L−1) at SN using the 30 Weighted-RRCF-specific attribution algorithm. Note that the level of the sibling node SN is L, and that if q were not present the vector {a(j, L−1)} would correspond to q's anomaly score.

5. Let the bounding box of SN be $B_s$ with side lengths $s_1, s_2, \ldots, s_d$.

6. If the parent of q is the root node, we skip to step 10 below.

7. Otherwise (the parent of q is not the root), set f(j, L−1)=a(j, L−1) for all dimensions. We now start with node u (the grandparent node of q) and proceed upwards to the root. Note that if q were absent from the tree, q's parent would also be absent and SN would have been promoted by one level.

8. We merge the bounding box Bs with the bounding box of the child of u which does not have q as a descendant. Observe that if the descendants of u are represented by the set $S_u$ then (the merged) $B_s$ is the bounding box for $S_u-\{q\}$. Let the sides of the merged bounding box be $s'_1, s'_2, \ldots, s'_d$.

9. Set $$f(j,L-2)=(1/(L-1))(l_j-s'_j)/\Sigma_i l_i+(1-(\Sigma_j s'_j/\Sigma_i l_i))f(j,L-1)$$

10. At the root node, return the per-dimension attributions $f(j,0)/\Sigma_i f(i,0))$ Score(q)

Directionality Analysis

In some embodiments, as mentioned earlier, information about the direction in which the value of a given dimension could be changed in order to positively or negatively impact the anomaly score of a data point (or similar data points) may be generated as part 30 of the anomaly detection analysis. In effect, such information may be useful in responding to queries similar to "how should we change operations or observations and related processes so that a recorded data point is less of an anomaly" or, more specifically, "should the value of a given dimension d be increased or decreased to reduce/increase the anomaly score of a data point p (or similar future data points)?" Such information may be referred to as directionality information in various embodiments.

An algorithm for directionality analysis, usable for various random cut forest algorithms including RRCFs as well as isolation forests, is provided below. In embodiments in which RRCFs are being used, the operations of this algorithm may be performed in conjunction with the operations of the Weighted-RRCF-Specific Attribution Algorithm described earlier—in effect, that attribution algorithm may be enhanced by adding directionality analysis. Similar enhancements may be incorporated into other random cut tree-based attribution algorithms (e.g., generalized algorithms or algorithms which use isolation forests) in various embodiments.

In some embodiments, according to the Directionality Analysis Algorithm shown below, at every level L of a given random cut tree T_ at which an attribution metric a(j,L) is obtained for dimension j of a data point q, a two-dimensional directionality vector [a(j, Max-Incr, L), a(j, Min-Decr, L)] may be computed, preserving the invariant a(j,L)=a(j, Max-Incr, L)+a(j, Min-Decr, L). The label "Max-Incr" stands for "maximum-increasing", indicating one direction in which the value of the jth dimension may have affected the level-specific attribution, while the label "Min-Decr" stands for "minimum-decreasing", indicating the opposite direction. Other labels such as "spike" for maximum-increasing and "dip" for minimum-decreasing may be used in some embodiments.

In effect, the attribution a(j,L) may be subdivided into two components which collectively form the directionality vector in at least some embodiments. The Max-Incr component may correspond to a determination that the value of dimension j exceeds a highest previous value represented for j at level L, while the Min-Decr component may correspond to a determination that the value of dimension j is lower than the lowest previous value represented for j at level L. Expressed slightly differently, the value of the Max-Incr component corresponds to the contribution of dimension j to the anomaly score a(j,L) when the value of q in dimension j is observed to be larger than the comparison when the point q is separated by an axis parallel cut in dimension j. Similarly, the value of the Min-Decr component corresponds to the complementary case when the value was smaller but the separation was still due to an axis parallel cut in dimension j.

In a manner analogous to the aggregation or rolling-up of the anomaly score contributions discussed earlier for the different levels of a given tree and for different trees, in various embodiments directionality components for a given dimension may be aggregated within a tree to obtain a vector of tree-specific directionality components, and these tree-level vectors may be aggregated across the different trees being used to obtain an overall maximum-increasing component and an overall minimum-decreasing component. Based on an analysis of such aggregated components, directionality information pertaining to a given data point q may be provided in various embodiments. Such directionality information may for example indicate whether an increase in the value of a given dimension j would have resulted in a decrease of the anomaly score of q, or whether a decrease in the j value would have resulted in a decrease of the anomaly score of q. In some embodiments, other statistics (such as the mean/median values for each dimension among the sampled data) may be provided to clients as well as the directionality information, which may also help in the explanations of the anomaly scores.

Directionality Analysis Algorithm

1. Given a d-dimensional bounding box $B_L$ at level L of T_ with edge lengths $l_1, \ldots, l_d$. If we are not at a leaf node of T_, suppose the cut or split is C along split dimension s.

2. Suppose the dimension j of the box $B_L$ is defined by the interval $[b^-_j, b^+_j]$; therefore, $l_j=b^+_j-b^-_j$ 3. Given the point $q=(q_1, q_2, \ldots, q_d)$, let the side lengths of a new bounding box (which contains q) $B'_L=B_L \cup (q)$ be $l'_1, \ldots, l'_d$. Note that the interval corresponding to the $j^{th}$ dimension is now $$[\min\{q_j,b^-_j\},\max\{q_j,b^+_j\}]$$

Note also that $l'_j=\max\{q_j, b^+_j\})-\min\{q_j, b^-_j\}$, and that $\forall j$, $l_j <= l'_j$.

4. At a leaf node (assuming no duplicates) return the vector $a(.,.,L)$, where: if $q_j$ is larger than the value of the j dimension of the leaf node:

$$a(j,\text{Max-Incr},L)=F(j,B'_L)/(L+1) a(j,\text{Min-Decr},L)=0$$

else (i.e., $q_j$ is not larger):

$$a(j,\text{Max-Incr},L)=0 \quad a(j,\text{Min-Decr},L)=F(j,B'_L)/(L+1)$$

Note that if $q_j$ is equal to the value of the j dimension of the leaf node, both $a(j,\text{Max-Incr},L)$ and $a(j,\text{Min-Decr},L)$ would be set to zero. Note also that the split at the leaf node would make the depth of the new leaf node $L+1$.

5. Otherwise (if we are not at a leaf node of T_) the dimension s corresponding to the cut C at level L of T_ exists; this implies that $l'_s >= l_s > 0$. Define:

$$z_s=(l_s F(s,B'_L))/(l'_s F(s,B_L))$$

(As discussed earlier, for (weighted) RRCFs, note that $z_s = \Sigma_i w_i l_i / \Sigma_i w_i l'_i = z$, independent of the dimensions)

6. Compute the vector $a(.,L+1)$ recursively by following the cut C in dimension s.

7. Return the vector $a(j,.,L)$ obtained by the following conditional logic:

if q is larger than the highest value of the j dimension in $B_L$:

$$a(j,\text{Max-Incr},L)=z_s a(j,\text{Max-Incr},L+1)+((l'_i-l_i)/l'_i) F(j,B'_L)$$

else (i.e., $q_j$ is not larger):

$$a(j,\text{Max-Incr},L)=z_s a(j,\text{Max-Incr},L+1)$$

if $q_j$ is smaller than the smallest value of the j dimension in $B_L$:

$$a(j,\text{Min-Decr},L)=z_s a(j,\text{Min-Decr},L+1)+((l'_i-l_i)/l'_i)F(j,B'_L)$$

else (i.e., $q_j$ is not smaller):

$$a(j,\text{Min-Decr},L)=z_s a(j,\text{Min-Decr},L+1)$$

In the toy example discussed above, in the context of FIG. 8-FIG. 10, in which the anomaly score for a data point P8 (x=109, y=25) and the corresponding contribution estimates were estimated, the execution of the above directionality algorithm would eventually result in an $a(1,\text{Max-Incr}, 0)$ value equal to $a(1, 0)$, and an a $(2,\text{Max-Incr}, 0)$ value equal to a $(2,0)$. The Min-Decr elements would all be zero. That is, in both dimensions x and y, the directionality of the anomaly with respect to P8 is towards increasing the maximum (with x being a larger contributor than y to the anomaly score as indicated by the quantities computed in the example). As such, in order to decrease the anomaly score of P8 or similar points, decreasing the value of the x dimension somewhat would be the best choice, and decreasing the value of they dimension somewhat may also help (although not as much as decreasing the value of x). Of course, in such a small example, deducing that decreasing the values of either dimension may help reduce the anomaly score is possible simply by examining the ranges of the values already in the tree and comparing the new data point's values to them; the problem of providing dimensionality information (as well as pre-dimension contribution information) becomes harder when the number of dimensions and/or data points is much larger. It is noted that in some embodiments in which anomaly scores and per-dimension contributions are estimated using random cut forests as described earlier, directionality analysis may not necessarily be performed.

Hypothetical Queries

The analysis and per-dimension attribution of anomaly scores has been discussed above with regard to the actual dimension values of data points received in a stream. In at least some embodiments, a stream management and analysis service may also be able to provide answers to some additional types of hypothetical queries regarding anomaly scores, such as (1) what would the rate of contribution of dimension j to the anomaly score of data point q have been if q were modified slightly? or (2) what would the contribution of dimension j to the anomaly score of data point q have been if the relative importance or weights of the dimensions were changed? (Queries regarding changes to dimension weights may, of course, be inapplicable to anomaly detection algorithms (such as Isolation Forests) which treat all dimensions equally by definition.) At least some such hypothetical queries may be answered in various embodiments by computing the partial derivative or gradient of the anomaly score with respect to the different dimensions in the neighborhood of the queried data point. It is noted that an anomaly score may be computed using a Monte Carlo estimation in at least some embodiments, and the Monte Carlo sampling may be re-biased to compute an unbiased gradient in such embodiments. In at least one embodiment, a convective derivative operator may be used to respond to hypothetical queries associated with changing dimension weights.

Use Cases

The techniques described above, of rapidly and efficiently performing anomaly detection on streaming data, attributing portions of the computed anomaly scores to individual dimensions, and/or providing directionality information for various dimensions, may be useful in a variety of environments. Identifying explanations for anomalous or unusual data among fast-arriving records may be critical for fraud detection, intrusion detection, proactive responses to potential failures in hardware systems, appliances or automobiles, and the like. Retailing organizations may be able to isolate drops in order rates and react accordingly based on dimension-level explanations of the drops using the attribution algorithms discussed. A number of health-related applications may also benefit from such techniques, e.g., to identify the paths to be taken to identify potential causes of unusual heart behavior before heart attacks, unusual blood chemistry levels before diseases such as diabetes become severe, and so on. Using resources of a provider network at which a machine learning service or a stream analysis service is implemented may allow large amounts of computing resources to be dedicated in a flexible manner to anomaly detection and attribution, and may allow knowledge gained from previous experience to be shared to improve the results obtained in subsequent anomaly analyses. In some cases, the anomaly detection or attribution algorithms may be implemented as a subcomponent of a larger monitoring facility or tool associated with an e-commerce website and/or a provider network. The anomaly attribution analysis of such a tool may for example help to generate quick (or even proactive) responses to potentially problematic situations such as resource overloads or non-responsive services. In general, the kinds of anomaly-related analysis techniques discussed above may help achieve at least incremental progress towards the goal of transparent, interpretable and explainable machine learning, which is an increasing focus of research and development.

Illustrative Computer System

Figure 13:
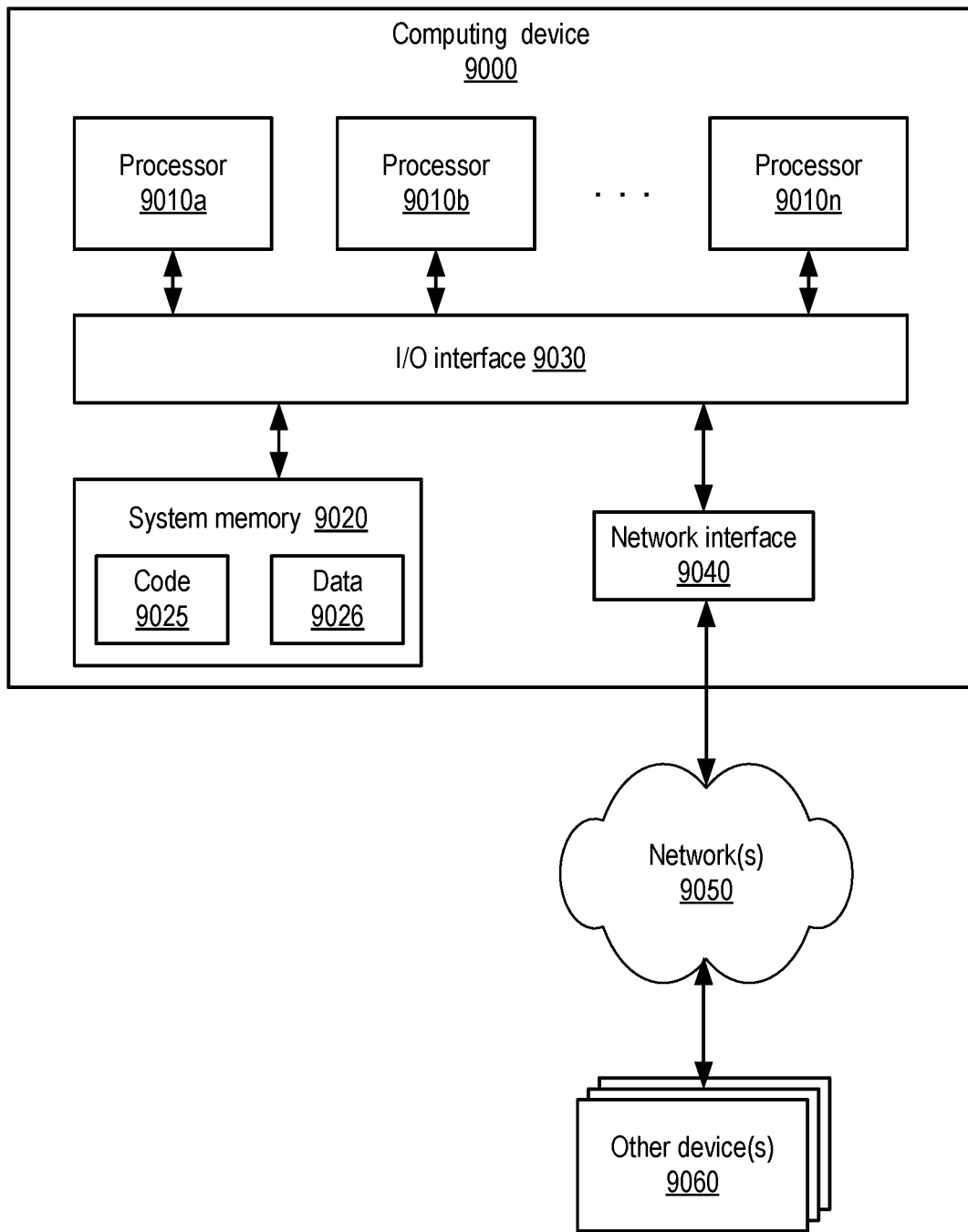
FIG. 13 is a block diagram illustrating an example computing device that may be used in at least some embodiments.

In at least some embodiments, a server that implements a portion or all of one or more of the technologies described herein, including the techniques used to collect, store, analyze (e.g., with respect to anomaly scores and per-dimension contributions to those scores) and retrieve stream data, may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 12 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of an artificial intelligence service for stream data analysis;
wherein the one or more computing devices are configured to:
generate a plurality of random cut trees corresponding to respective samples of a streaming data set, wherein individual ones of the data points of the streaming data set comprise respective values of a plurality of dimensions, wherein generating a particular random cut tree corresponding to a particular sample comprises performing one or more splits of at least a portion of the particular sample on a split value selected for a particular dimension;
determine, based at least in part on a traversal of the particular random cut tree using values of one or more dimensions of a particular data point to select traversed edges, a tree-specific vector indicating respective contributions of individual ones of the plurality of dimensions to an anomaly score of the particular data point, wherein determining the tree-specific vector comprises:
computing, at an individual level of the particular random cut tree, based at least in part on a bounding box analysis associated with the individual level and the particular data point, a respective level-specific vector indicative of respective contributions of individual ones of the plurality of dimensions to the anomaly score; and
aggregating a plurality of level-specific vectors;
obtain, using respective tree-specific vectors corresponding to at least a subset of the plurality of random cut trees, an overall anomaly score contribution estimate of at least a selected dimension of the plurality of dimensions; and
in response to an anomaly score attribution query, provide an indication of the overall anomaly score contribution estimate.

2. The system as recited in claim 1, wherein to determine the tree-specific vector, the one or more computing devices are configured to:
determine a first entry of a first level-specific vector corresponding to a leaf node of the particular random cut tree encountered during the traversal, wherein the first entry corresponds to a first dimension of the plurality of dimensions of the particular data point, wherein the first entry is based at least in part on:
a result of a dimension-selection function associated with a potential insertion of the particular data point as a child of the leaf node with the first dimension as a separating dimension; and
a depth of the leaf node within the particular random cut tree.

3. The system as recited in claim 2, wherein to determine the tree-specific vector, the one or more computing devices are configured to:

determine a second entry of a second level-specific vector corresponding to a first non-leaf node encountered during the traversal, wherein the second entry of the second level-specific vector corresponds to the first dimension, and wherein the second entry is based at least in part on:
a result of a dimension-selection function associated with a potential insertion of the particular data point as a child of the non-leaf node with the first dimension as a separating dimension;
a depth of the non-leaf node within the particular random cut tree; and
a weighted value of a third entry of a third level-specific vector corresponding to a child node of the first non-leaf node, wherein the third entry corresponds to the first dimension.

4. The system as recited in claim 1, wherein the one or more computing devices are configured to:
determine that a second data point is a duplicate of another data point of the streaming data set, wherein the other data point is part of the particular sample;
obtain, based at least in part on an occurrence count of the second data point in the particular sample, an anomaly score of the second data point; and
provide a respective indication of (a) the anomaly score of the second data point, or (b) an anomaly score contribution estimate of a first dimension of the second data point, wherein the anomaly score contribution estimate is based at least in part on a bounding box of a sibling node of a leaf node representing the other data point in the particular random cut tree.

5. The system as recited in claim 1, wherein the one or more computing devices are configured to:
in response to determining that an anomaly score of another data point of the data stream exceeds a threshold, providing a respective indication, with respect to one or more dimensions of the other data point, of per-dimension anomaly score contribution estimates.

6. A method, comprising:
performing, by one or more computing devices:
determining, based at least in part on a traversal of a particular random cut tree corresponding to a particular sample of a data set, wherein a particular data point of the data set comprises respective values of a plurality of dimensions, a tree-specific vector indicating respective contributions of individual ones of the dimensions to an anomaly score of the particular data point, wherein determining the tree-specific vector comprises aggregating one or more level-specific vectors obtained using respective bounding box analyses at one or more levels of the particular random cut tree;
obtaining, using respective tree-specific vectors corresponding to one or more random cut trees including the particular random cut tree, an overall anomaly score contribution estimate of at least a selected dimension of the plurality of dimensions; and
providing an indication of the overall anomaly score contribution estimate of the selected dimension.

7. The method as recited in claim 6, wherein determining the tree-specific vector comprises:
determining a first entry of a first level-specific vector corresponding to a leaf node of the particular random cut tree encountered during the traversal, wherein the first entry corresponds to a first dimension of the plurality of dimensions of the particular data point, wherein the first entry is based at least in part on:

a dimension-selection function associated with a potential insertion of the particular data point as a child of the leaf node with the first dimension as a separating dimension; and a depth of the leaf node.

8. The method as recited in claim 7, wherein a value of the dimension-selection function is based at least in part on:

a difference between the respective values of the first dimension of (a) the particular data point and (b) the leaf node; and a sum of the differences between values of the plurality of dimensions of the particular data point and the leaf node.

9. The method as recited in claim 7, wherein determining the tree-specific vector comprises:

determining a second entry of a second level-specific vector corresponding to a first non-leaf node encountered during the traversal, wherein the second entry of the second level-specific vector corresponds to the first dimension, and wherein the second entry is based at least in part on:

a dimension-selection function associated with a potential insertion of the particular data point as a child of the non-leaf node with the first dimension as a separating dimension;

a depth of the non-leaf node; and a weighted value of a third entry of a third level-specific vector corresponding to a child node of the first non-leaf node, wherein the third entry corresponds to the first dimension.

10. The method as recited in claim 6, further comprising performing, by the one or more computing devices:

selecting, from the data set, a plurality of data points of the particular sample;

identifying a particular dimension of the plurality of dimensions as a split target dimension based at least in part on a value range of the particular dimension; and splitting at least a portion of the particular sample based on a split value selected for the split target dimension.

11. The method as recited in claim 6, further comprising performing, by the one or more computing devices:

selecting, from the data set, a plurality of data points of the particular sample;

identifying a particular dimension of the plurality of dimensions as a split target dimension based at least in part on random selection; and splitting at least a portion of the particular sample based on a split value selected for the split target dimension.

12. The method as recited in claim 6, further comprising performing, by the one or more computing devices:

computing the anomaly score of the particular data point based at least in part on one or more of: (a) a sparsity metric corresponding to a potential insertion location of the particular data point within the particular random cut tree, (b) respective distance metrics computed with respect to one or more nodes of the particular random cut tree and a potential insertion location of the particular data point, or (c) a displacement metric corresponding to a potential insertion location of the particular data point.

13. The method as recited in claim 6, further comprising performing, by the one or more computing devices:

determining that a second data point is a duplicate of another data point of the data set, wherein the other data point is part of the particular sample;

computing, based at least in part on an occurrence count of the second data point in the particular sample, an anomaly score of the second data point; and providing a respective indication of (a) the anomaly score of the second data point, or (b) an anomaly score contribution estimate of a first dimension of the second data point, wherein the anomaly score contribution estimate is based at least in part on a bounding box of a sibling node of a leaf node representing the other data point in the particular random cut tree.

14. The method as recited in claim 6, further comprising performing, by the one or more computing devices:

determining that an anomaly score attribution query pertaining to the particular data record has been submitted via a programmatic interface, wherein said providing the indication of the overall anomaly score contribution estimate is responsive to the anomaly score attribution query.

15. The method as recited in claim 6, further comprising performing, by the one or more computing devices, wherein said providing the indication of the overall anomaly score contribution estimate is responsive to determining that the anomaly score of the particular data record exceeds a threshold.

16. The method as recited in claim 6, further comprising performing, by the one or more computing devices:

obtaining, at a particular level of the particular random cut tree, from a level-specific contribution of a particular dimension to the anomaly score of the particular data point into a maximum-increasing component and a minimum-decreasing component, wherein the maximum-increasing contribution corresponds to a determination that the value of the particular dimension with respect to the particular data point exceeds a highest previous value represented for the particular dimension at the particular level, and wherein the minimum-decreasing component corresponds to a determination that the value of the particular dimension with respect to the particular data point is lower than a lowest previous value represented for the particular dimension at the particular level;

aggregating the respective maximum-increasing components for a plurality of levels of the random cut tree to determine a tree-level maximum-increasing component for the particular dimension;

aggregating the respective minimum-decreasing components for a plurality of levels of the random cut tree to determine a tree-level minimum-decreasing component for the particular dimension; and providing directionality information pertaining to the particular data point, wherein the directionality information is based at least in part on an analysis of (a) an overall maximum-increasing component computed using respective tree-level maximum-increasing components corresponding to the one or more random cut trees and (b) an overall minimum-decreasing component computed using respective tree-level minimum-decreasing components corresponding to the one or more random cut trees, and wherein the directionality information comprises an indication of whether:

an increase in the value of the particular dimension would have resulted in a decrease in the anomaly score of the particular data point; or a decrease in the value of the particular dimension would have resulted in a decrease in the anomaly score of the particular data point.

17. The method as recited in claim 6, wherein the data set comprises at least a portion of one or more of: (a) a batch data set, or (b) a streaming data set.

18. The method as recited in claim 6, further comprising:
selecting one or more parameters associated with determining the overall anomaly score contribution estimate based at least in part on a resource constraint of a particular computing device of the one or more computing devices; and
determining the overall anomaly score contribution estimate at the particular computing device during a time interval in which the particular device is not connected to a set of remote computing resources.

19. A non-transitory computer-accessible storage medium storing program instructions that when executed on one or more processors cause the one or more processors to:
determine, based at least in part on a traversal of a particular random cut tree corresponding to a particular sample of a data set, wherein a particular data point of the data set comprises respective values of a plurality of dimensions, a tree-specific vector indicating respective contributions of individual ones of the dimensions to an anomaly score of the particular data point, wherein determining the tree-specific vector comprises aggregating one or more level-specific vectors obtained using respective bounding box analyses at one or more levels of the particular random cut tree;
obtain, using respective tree-specific vectors corresponding to one or more random cut trees including the particular random cut tree, an overall anomaly score contribution estimate of at least a selected dimension of the plurality of dimensions; and
provide an indication of the overall anomaly score contribution estimate of the selected dimension.

20. The non-transitory computer-accessible storage medium as recited in claim 19, wherein to determine the tree-specific vector, the instructions when executed on the one or more processors cause the one or more processors to:
determine a first entry of a first level-specific vector corresponding to a leaf node of the particular random cut tree encountered during the traversal, wherein the first entry corresponds to a first dimension of the plurality of dimensions of the particular data point, wherein the first entry is based at least in part on:
a dimension-selection function associated with a potential insertion of the particular data point as a child of the leaf node with the first dimension as a separating dimension; and
a depth of the leaf node.

21. The non-transitory computer-accessible storage medium as recited in claim 20, wherein to determine the tree-specific vector, the instructions when executed on the one or more processors cause the one or more processors to:
determine a second entry of a second level-specific vector corresponding to a first non-leaf node encountered during the traversal, wherein the second entry of the second level-specific vector corresponds to the first dimension, and wherein the second entry is based at least in part on:
a dimension-selection function associated with a potential insertion of the particular data point as a child of the non-leaf node with the first dimension as a separating dimension;
a depth of the non-leaf node; and
a weighted value of a third entry of a third level-specific vector corresponding to a child node of the first non-leaf node, wherein the third entry corresponds to the first dimension.

22. The non-transitory computer-accessible storage medium as recited in claim 19, wherein the instructions when executed on the one or more processors cause the one or more processors to:
determine that an anomaly score attribution query pertaining to the particular data point has been submitted via a programmatic interface, wherein the indication of the overall anomaly score contribution estimate is provided in response to the anomaly score attribution query.

23. The non-transitory computer-accessible storage medium as recited in claim 19, wherein the indication of the overall anomaly score contribution estimate is provided in response to a determination that the anomaly score of the particular data record exceeds a threshold.

* * * * *